(12) United States Patent
Shi et al.

(10) Patent No.: US 8,374,083 B2
(45) Date of Patent: Feb. 12, 2013

(54) METHODS AND SYSTEMS FOR PRIORITY-BASED SERVICE REQUESTS, GRANTS FOR SERVICE ADMISSION AND NETWORK CONGESTION CONTROL

(75) Inventors: Guangming Carl Shi, San Diego, CA (US); Tom Chin, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 67 days.

(21) Appl. No.: 12/166,652

(22) Filed: Jul. 2, 2008

(65) Prior Publication Data

US 2010/0002579 A1   Jan. 7, 2010

(51) Int. Cl.
*H04W 72/10* (2009.01)
(52) U.S. Cl. .................. 370/230; 370/349; 455/453
(58) Field of Classification Search .................. None
See application file for complete search history.

(56) References Cited

U.S. PATENT DOCUMENTS

| | | | | |
|---|---|---|---|---|
| 5,886,634 | A * | 3/1999 | Muhme | 340/572.1 |
| 6,061,559 | A * | 5/2000 | Eriksson et al. | 455/435.3 |
| 6,889,048 | B1 * | 5/2005 | Koo | 455/452.1 |
| 7,333,496 | B1 * | 2/2008 | Patel et al. | 370/395.42 |
| 7,522,607 | B2 * | 4/2009 | Bugenhagen et al. | 370/395.42 |
| 7,577,161 | B2 | 8/2009 | Li et al. | |
| 2004/0165228 | A1 | 8/2004 | Ueno | |
| 2005/0037770 | A1 * | 2/2005 | Takeda et al. | 455/453 |
| 2008/0013558 | A1 | 1/2008 | Ito et al. | |
| 2008/0056295 | A1 | 3/2008 | Loda et al. | |

FOREIGN PATENT DOCUMENTS

| | | |
|---|---|---|
| JP | 2001169360 A | 6/2001 |
| JP | 2007043310 A | 2/2007 |
| KR | 20010046636 A | 6/2001 |

OTHER PUBLICATIONS

Gao Xia, Wu Gang: "On terminal-based resource reservation coordination" IEEE on Global Telecommunications Conference 2003 (GLOBECOM 2003), [Online] vol. 7, Dec. 1-5, 2003, pp. 3787-3791, XP002526234 Retrieved from the Internet: URL:http://ieeexplore.ieee.org/stamp/stamp .jsp?arnumber=01258940> [retrieved on Apr. 30, 2009] the whole document.
International Search Report & Written Opinion—PCT/US2009/049460, International Search Authority—European Patent Office—Oct. 8, 2009.

* cited by examiner

*Primary Examiner* — Kwang B Yao
*Assistant Examiner* — Alex Skripnikov
(74) *Attorney, Agent, or Firm* — Tyler J. Overall

(57) ABSTRACT

A method for priority-based network congestion control may be implemented by a network entity. The method may include determining one or more priorities associated with a service request that is being processed by the network entity. The method may also include determining resource availability. The method may also include determining whether to grant the service request based on the one or more priorities associated with the service request and the resource availability.

36 Claims, 21 Drawing Sheets

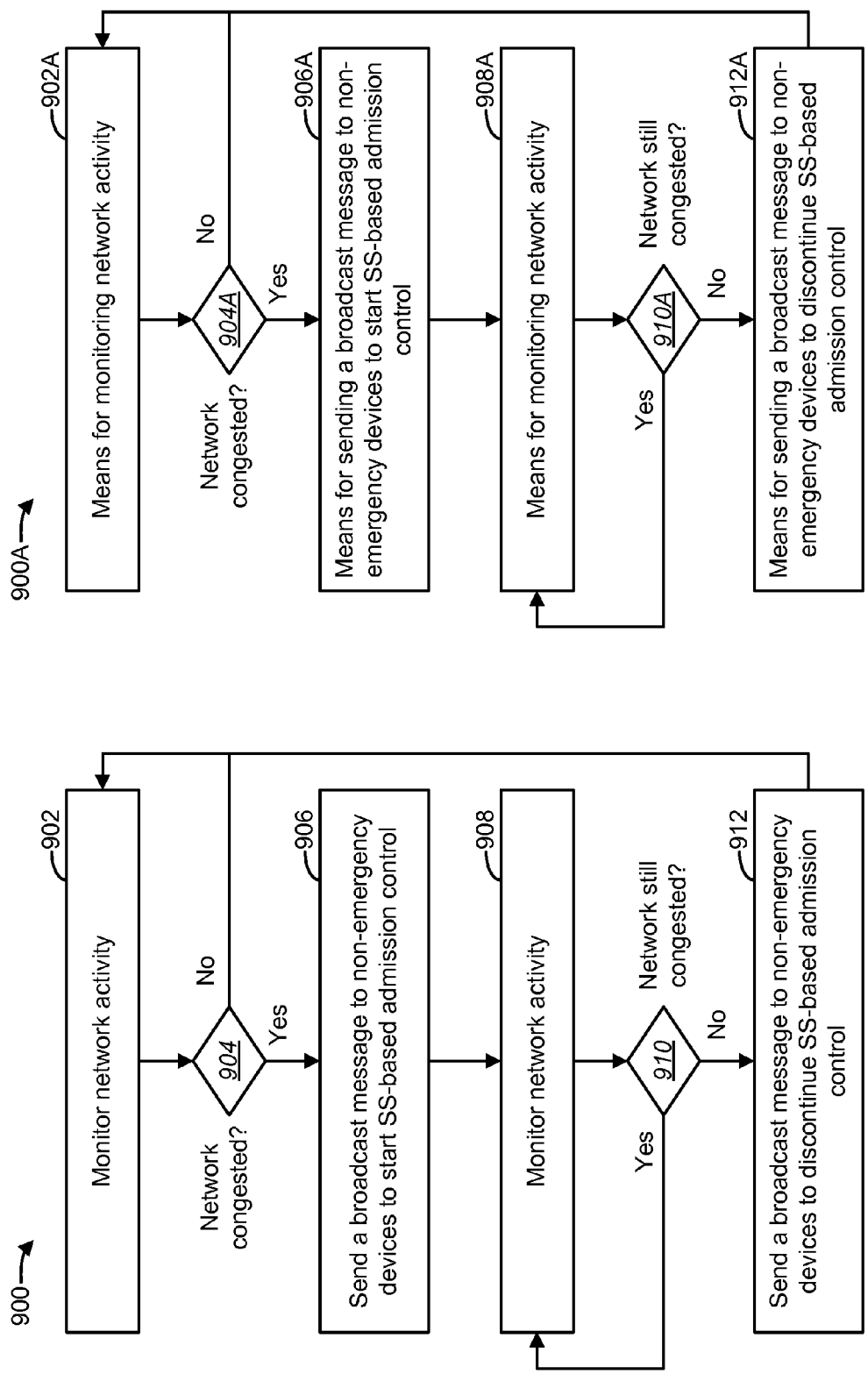

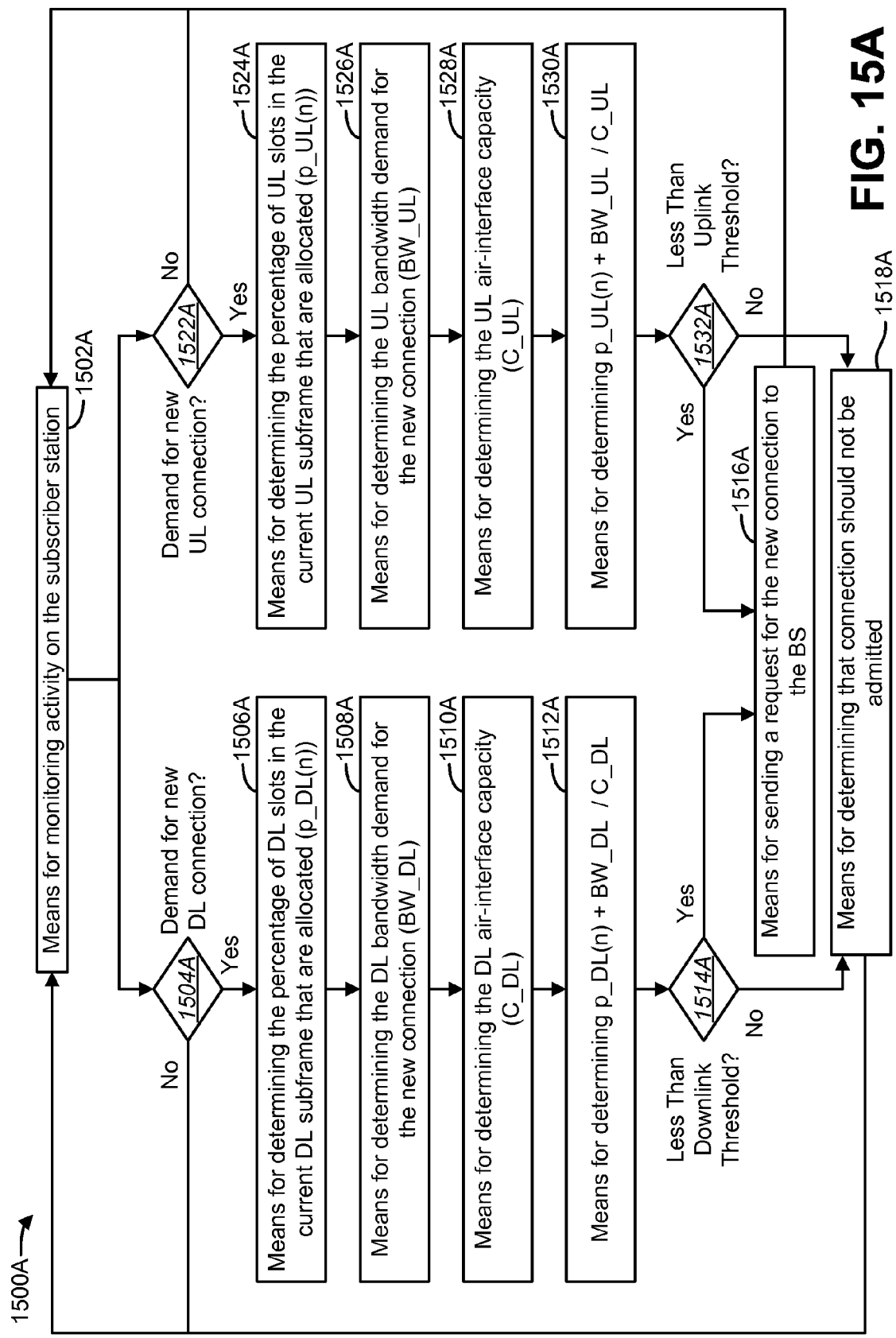

METHODS AND SYSTEMS FOR PRIORITY-BASED SERVICE REQUESTS, GRANTS FOR SERVICE ADMISSION AND NETWORK CONGESTION CONTROL

TECHNICAL FIELD

The present disclosure relates generally to wireless communication technology. More specifically, the present disclosure relates to methods and apparatus for priority-based service requests and grants for service admission and network congestion control.

BACKGROUND

As used herein, the term "subscriber station" refers to an electronic device that may be used for voice and/or data communication over a wireless communication network. Examples of subscriber stations include cellular phones, personal digital assistants (PDAs), handheld devices, wireless modems, laptop computers, personal computers, etc. A subscriber station may alternatively be referred to as a mobile station, a mobile terminal, an access terminal, a remote station, a user terminal, a terminal, a subscriber unit, user equipment, etc.

A wireless communication network may provide communication for a number of subscriber stations, each of which may be serviced by a base station. A base station may alternatively be referred to as an access point, a Node B, or some other terminology.

A subscriber station may communicate with one or more base stations via transmissions on the uplink and the downlink. The uplink (or reverse link) refers to the communication link from the subscriber station to the base station, and the downlink (or forward link) refers to the communication link from the base station to the subscriber station.

The resources of a wireless communication network (e.g., bandwidth and transmit power) may be shared among multiple subscriber stations. A variety of multiple access techniques are known, including code division multiple access (CDMA), time division multiple access (TDMA), frequency division multiple access (FDMA), and orthogonal frequency division multiple access (OFDMA).

BRIEF DESCRIPTION OF THE DRAWINGS

FIG. 7A illustrates means-plus-function blocks corresponding to the method of FIG. 7;

FIG. 9 illustrates an example of a method for activating/deactivating admission control within subscriber stations;

FIG. 9A illustrates means-plus-function blocks corresponding to the method of FIG. 9;

FIG. 12A illustrates means-plus-function blocks corresponding to the method of FIG. 12;

FIG. 15A illustrates means-plus-function blocks corresponding to the method of FIG. 15;

SUMMARY

Figure 1:
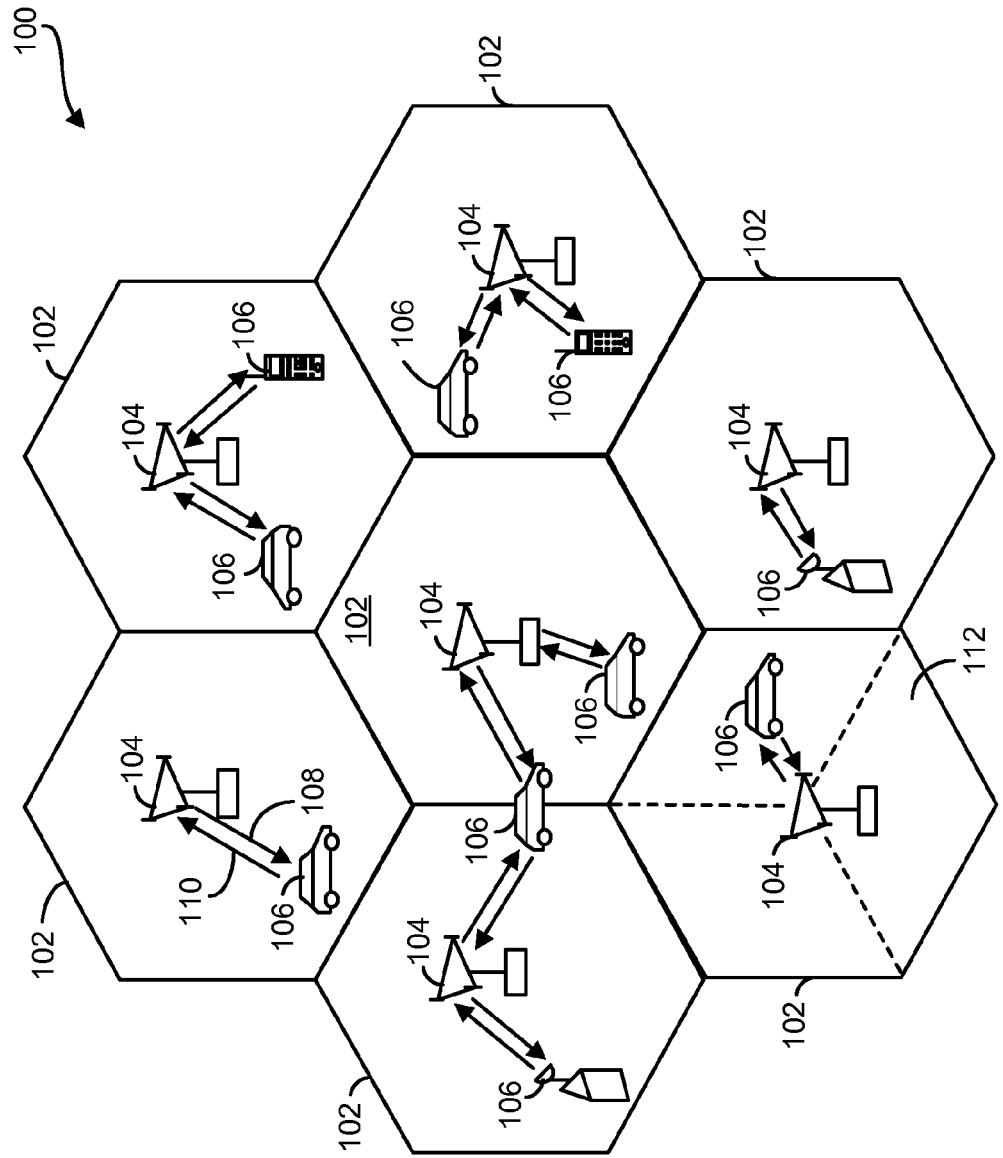
FIG. 1 illustrates an example of a wireless communication network.

A method for priority-based network congestion control is disclosed. The method may be implemented by a network entity. The method may include determining one or more priorities associated with a service request that is being processed by the network entity. The method may also include determining resource availability. The method may also include determining whether to grant the service request based on the one or more priorities associated with the service request and the resource availability.

A method for priority-based network congestion control is disclosed. The method may be implemented by a subscriber station. The method may include transmitting a service request that comprises one or more priorities that are associated with the service request. The method may also include receiving an instruction from a network entity to implement subscriber station-based admission control. The method may also include implementing subscriber station-based admission control in response to the instruction from the network entity.

A network entity that is configured to implement priority-based network congestion control is disclosed. The network entity includes a processor and memory in electronic communication with the processor. Instructions are stored in the memory. The instructions may be executable by the processor to determine one or more priorities associated with a service request that is being processed by the network entity. The instructions may also be executable to determine resource availability. The instructions may also be executable to determine whether to grant the service request based on the one or more priorities associated with the service request and the resource availability.

A subscriber station that is configured to implement priority-based network congestion control is disclosed. The subscriber station includes a processor and memory in electronic communication with the processor. Instructions are stored in the memory. The instructions may be executable by the processor to transmit a service request that comprises one or more priorities that are associated with the service request. The instructions may also be executable by the processor to receive an instruction from a network entity to implement subscriber station-based admission control. The instructions may also be executable by the processor to implement subscriber station-based admission control in response to the instruction from the network entity.

A network entity that is configured to implement priority-based network congestion control is also disclosed. The network entity may include means for determining one or more priorities associated with a service request that is being processed by the network entity. The network entity may also include means for determining resource availability. The network entity may also include means for determining whether to grant the service request based on the one or more priorities associated with the service request and the resource availability.

A subscriber station that is configured to implement priority-based network congestion control is also disclosed. The subscriber station may include means for transmitting a service request that comprises one or more priorities that are associated with the service request. The subscriber station may also include means for receiving an instruction from a network entity to implement subscriber station-based admission control. The subscriber station may also include means for implementing subscriber station-based admission control in response to the instruction from the network entity.

A computer-program product for implementing priority-based network congestion control is disclosed. The computer-program product may include a computer-readable medium having instructions thereon. The instructions may include code for determining one or more priorities associated with a service request that is being processed by a network entity. The instructions may also include code for determining resource availability. The instructions may also include code for determining whether to grant the service request based on the one or more priorities associated with the service request and the resource availability.

A computer-program product for implementing priority-based network congestion control is disclosed. The computer-program product includes a computer-readable medium having instructions thereon. The instructions may include code for transmitting a service request that comprises one or more priorities that are associated with the service request. The instructions may also include code for receiving an instruction from a network entity to implement subscriber station-based admission control. The instructions may also include code for implementing subscriber station-based admission control in response to the instruction from the network entity.

The methods, network entities, subscriber stations and computer-program products as presented herein, for example, as in the summary paragraphs presented above, wherein each can be configured to communicate via a wireless communication network that supports an Institute of Electronic and Electrical Engineers (IEEE) 802.16 standard.

DETAILED DESCRIPTION

The methods and apparatus of the present disclosure may be utilized in a broadband wireless communication network.

The term "broadband wireless" refers to technology that provides wireless, voice, Internet, and/or data network access over a given area.

The Institute of Electronic and Electrical Engineers (IEEE) 802.16 Working Group on Broadband Wireless Access Standards aims to prepare formal specifications for the global deployment of broadband Wireless Metropolitan Area Networks. Although the 802.16 family of standards is officially called WirelessMAN, it has been called "WiMAX" (which stands for the "Worldwide Interoperability for Microwave Access") by an industry group called the WiMAX Forum. Thus, the term "WiMAX" refers to a standards-based broadband wireless technology that provides high-throughput broadband connections over long distances.

Some of the examples described herein are relevant to wireless communication networks that are configured in accordance with WiMAX standards. However, these examples should not be interpreted as limiting the scope of the present disclosure.

WiMAX is based on OFDM (orthogonal frequency division multiplexing) and OFDMA (orthogonal frequency division multiple access) technology. OFDM is a digital multi-carrier modulation technique that has recently found wide adoption in a variety of high-data-rate communication networks. With OFDM, a transmit bit stream is divided into multiple lower-rate substreams. Each substream is modulated with one of multiple orthogonal subcarriers and sent over one of a plurality of parallel subchannels. OFDMA is a multiple access technique in which users are assigned subcarriers in different time slots. OFDMA is a flexible multiple-access technique that can accommodate many users with widely varying applications, data rates, and quality of service requirements.

FIG. 1 illustrates an example of a wireless communication network 100. The wireless communication network 100 provides communication for a number of cells 102, each of which is serviced by a base station 104. A base station 104 may be a fixed station that communicates with subscriber stations 106. The base station 104 may alternatively be referred to as an access point, a Node B, or some other terminology.

FIG. 1 shows various subscriber stations 106 dispersed throughout the network 100. The subscriber stations 106 may be fixed (i.e., stationary) or mobile. The subscriber stations 106 may alternatively be referred to as mobile stations, mobile terminals, access terminals, remote stations, user terminals, terminals, subscriber units, user equipment, etc. The subscriber stations 106 may be wireless devices, such as cellular phones, personal digital assistants (PDAs), handheld devices, wireless modems, laptop computers, personal computers, etc.

A variety of algorithms and methods may be used for transmissions in the wireless communication network 100 between the base stations 104 and the subscriber stations 106. For example, signals may be sent and received between the base stations 104 and the subscriber stations 106 in accordance with orthogonal frequency division multiple access (OFDMA), code division multiple access (CDMA), time division multiple access (TDMA), frequency division multiple access (FDMA), etc.

A communication link that facilitates transmission from a base station 104 to a subscriber station 106 may be referred to as a downlink 108, and a communication link that facilitates transmission from a subscriber station 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within the wireless communication network 100 may utilize antennas that concentrate the flow of power within a particular sector 112 of the cell 102.

Figure 2:
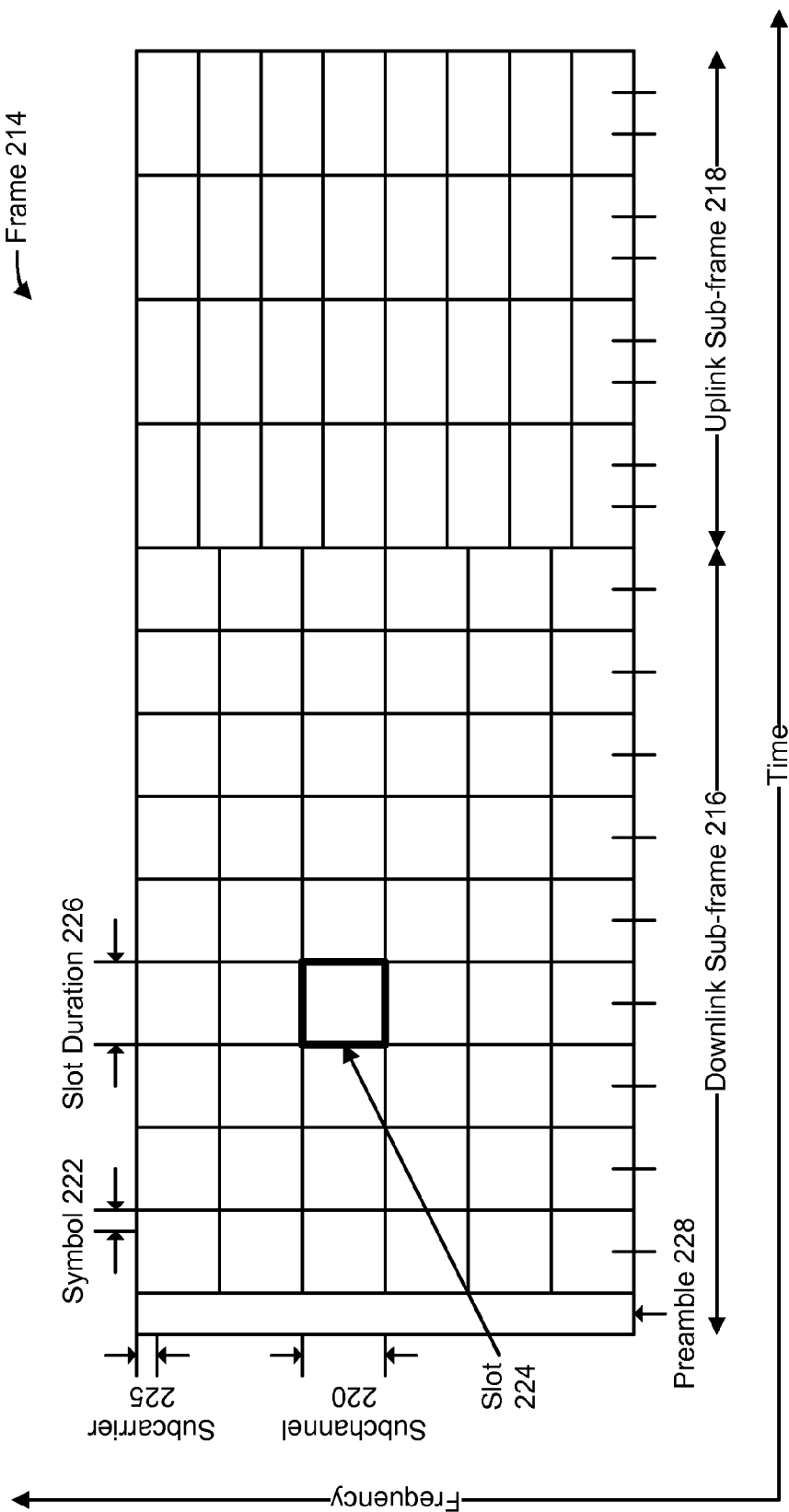
FIG. 2 illustrates an example showing certain aspects of the structure of a frame in a WiMAX network.

FIG. 2 illustrates an example showing certain aspects of the structure of a frame 214 in a WiMAX network. In a WiMAX network, a frame 214 is a time interval of constant length. For time division duplex (TDD) operation, each frame 214 is divided into a downlink (DL) sub-frame 216 and an uplink (UL) sub-frame 218. The downlink sub-frame 216 begins with a preamble 228.

In a WiMAX network, a slot 224 is the smallest unit to allocate bandwidth to users. A slot 224 is a subchannel 220 (i.e., a group of subcarriers 225) over a slot duration 226 (i.e., a certain number of symbols 222).

Figure 3:
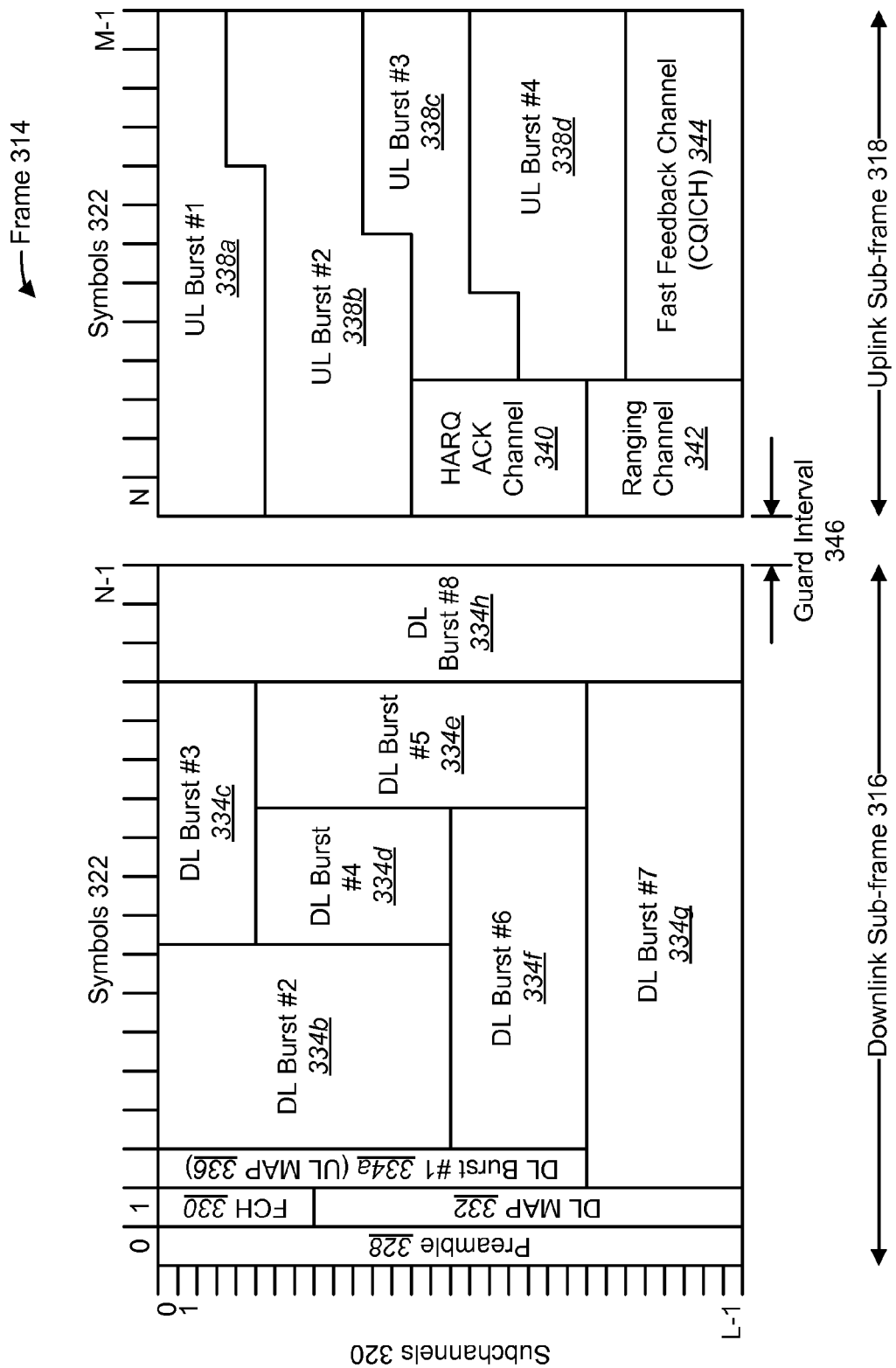
FIG. 3 illustrates an example showing certain additional aspects of the structure of a frame in a WiMAX network.

FIG. 3 illustrates an example showing certain additional aspects of the structure of a frame 314 in a WiMAX network. The frame 314 includes a downlink sub-frame 316 and an uplink sub-frame 318, separated by a guard interval 346. The frame 314 is transmitted over L subchannels 320. There are a total of M symbols 322 in the frame 314, N symbols 322 in the downlink sub-frame 316 and M-N symbols in the uplink sub-frame 318.

The downlink sub-frame 316 includes a preamble 328. The preamble 328 is used for physical layer procedures, such as time and frequency synchronization and initial channel estimation. The downlink sub-frame 316 also includes a frame control header (FCH) 330. The FCH 330 provides frame 314 configuration information, such as the MAP message length, the modulation and coding scheme, and the usable subcarriers 225.

Multiple users are allocated data regions within the frame 314, and these allocations are specified in the downlink MAP message 332 and the uplink MAP message 336. The MAP messages 332, 336 include the burst profile for each user, which defines the modulation and coding scheme that are used.

The downlink sub-frame 316 also includes multiple downlink bursts 334a-h. The first downlink burst 334a is typically the uplink MAP message 336. The downlink bursts 334a-h may be of varying size and type, and may carry data for several users.

The uplink sub-frame 318 includes multiple uplink bursts 338a-d, which may be from different users. The uplink sub-frame also includes a ranging channel 342, which may be used to perform closed-loop frequency, time, and power adjustments during network entry as well as periodically afterward. The ranging channel 342 may also be used by subscriber stations 106 to make uplink bandwidth requests.

The uplink sub-frame 318 also includes a channel-quality indicator channel (CQICH) 344 for the subscriber stations 106 to feed back channel-quality information that can be used by the scheduler at the base station 104. The CQICH 344 may also be referred to as a fast feedback channel 344. The uplink sub-frame 318 also includes a hybrid automatic repeat request (HARQ) acknowledgement (ACK) channel 340, which may be used by subscriber stations 106 to feed back downlink acknowledgements.

Figure 4:
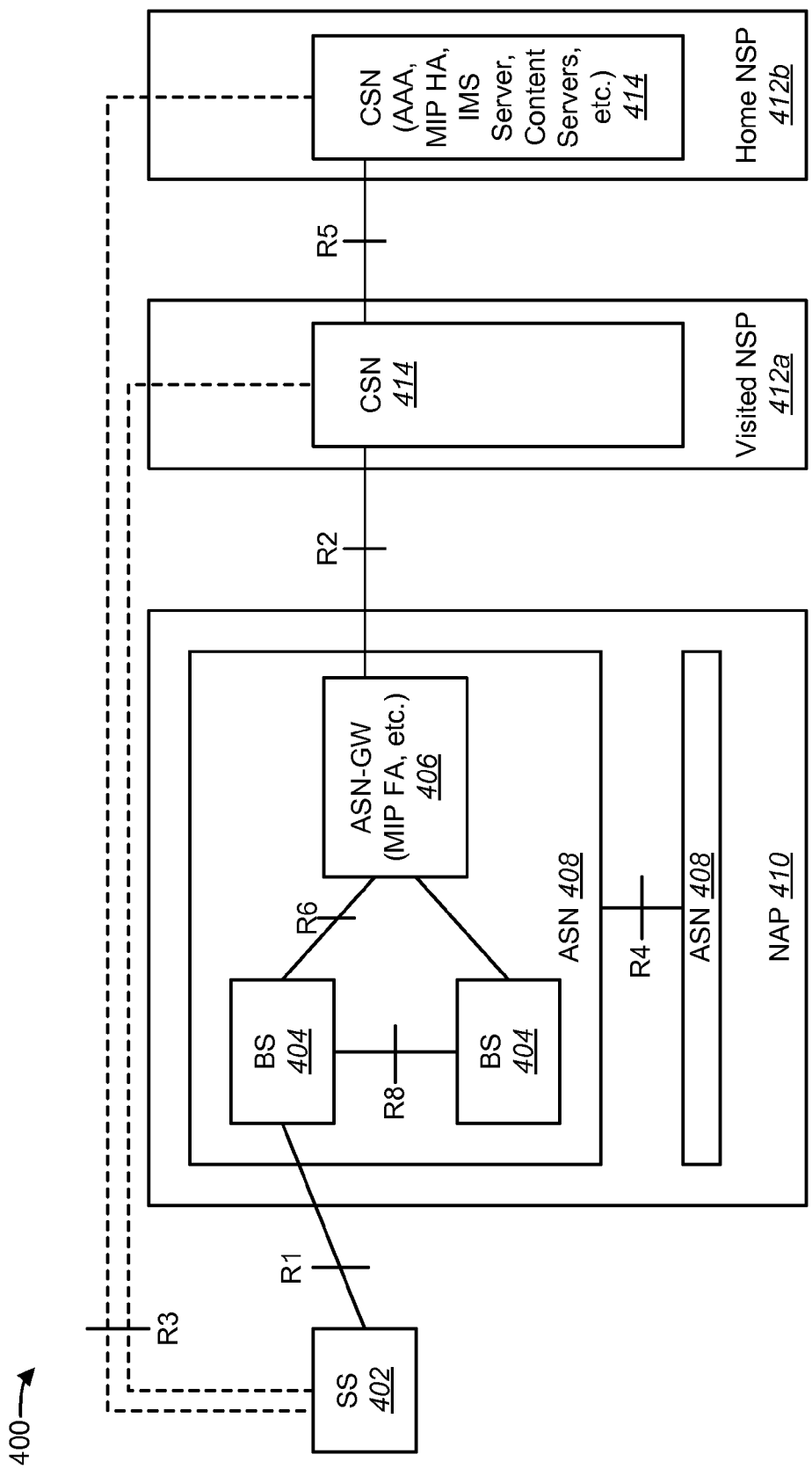
FIG. 4 illustrates an example of a WiMAX network architecture.

FIG. 4 illustrates an example of a WiMAX network architecture 400. A subscriber station 402 may be in electronic communication with a base station 404 via an R1 interface. A base station 404 may be in electronic communication with an access services network gateway (ASN-GW) 406 via an R6 interface. The ASN-GW 406 may be, for example, a mobile Internet protocol (IP) foreign agent (FA). A base station 404 may be in electronic communication with another base station 404 via an R8 interface.

Multiple base stations 404 and an ASN-GW 406 may collectively form an access services network (ASN) 408. An ASN 408 may be in electronic communication with other ASNs 408 via an R4 interface. Multiple ASNs 408 collectively form a network access provider (NAP) 410.

A subscriber station 402 may be in electronic communication with one or more connectivity services networks (CSN) 414. Examples of CSNs 414 include authentication, authorization, and accounting (AAA) servers, mobile IP home agents, IP multimedia subsystem servers, content servers, etc. A CSN 414 may be in electronic communication with an ASN-GW 406 via an R2 interface. A CSN 414 may be in electronic communication with another CSN 414 via an R5 interface.

A CSN 414 may be part of a network services provider (NSP) 412. A visited NSP 412a and a home NSP 412b are shown in FIG. 4. A subscriber station 402 may be in electronic communication with an NSP 412 via an R3 interface.

Figure 5:
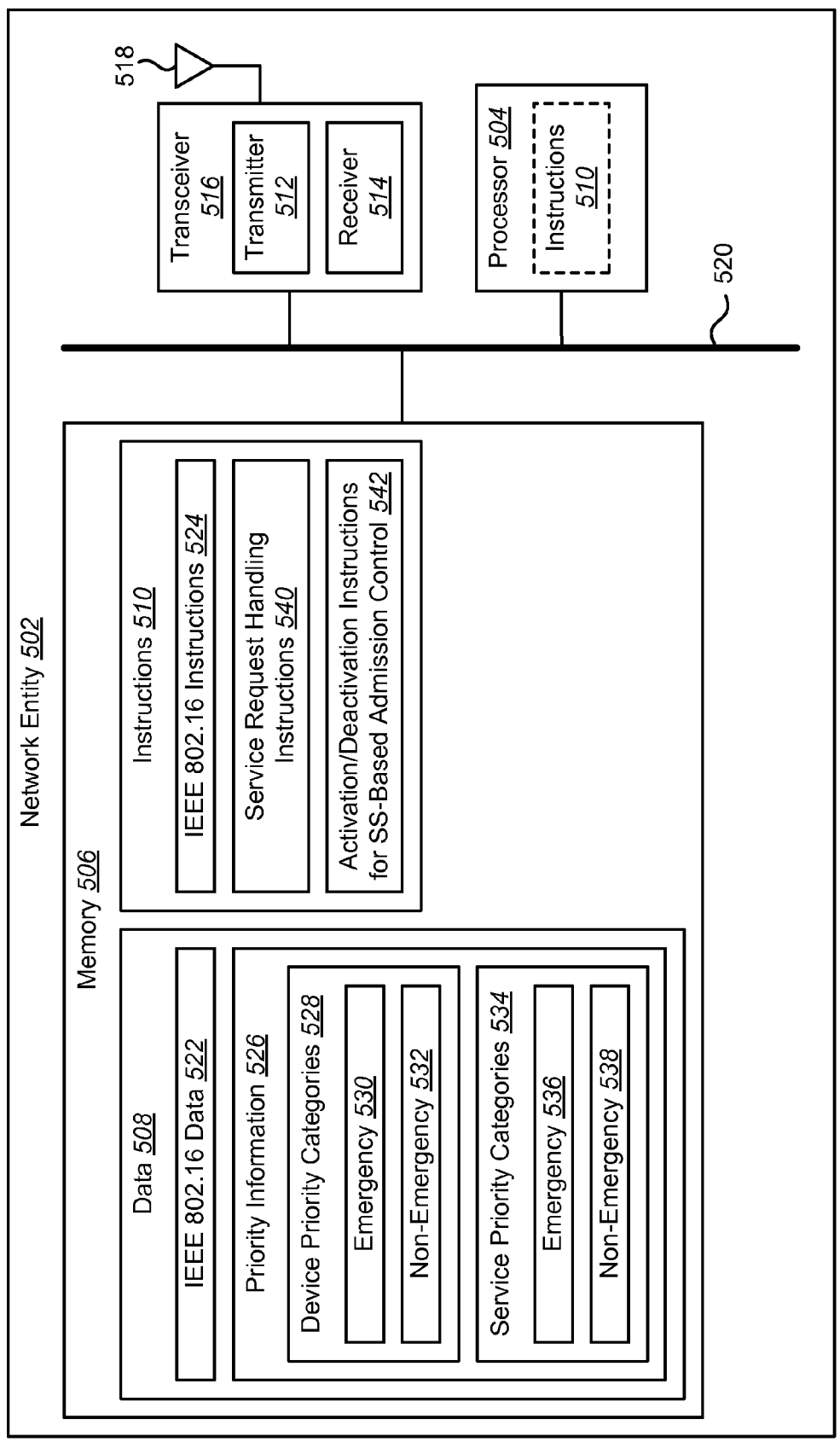
FIG. 5 illustrates an example of a network entity that is configured to implement priority-based network congestion control.

FIG. 5 illustrates an example of a network entity 502 that is configured to implement priority-based network congestion control. The network entity 502 may be an ASN-GW 406, a CSN 414, a base station 404, etc.

The network entity 502 includes a processor 504. The processor 504 may be a general purpose single- or multi-chip microprocessor (e.g., an ARM), a special purpose microprocessor (e.g., a digital signal processor (DSP)), a microcontroller, a programmable gate array, etc. The processor 504 may be referred to as a central processing unit (CPU). Although just a single processor 504 is shown in the network entity 502 of FIG. 5, in an alternative configuration, a combination of processors 504 (e.g., an ARM and DSP) could be used.

The network entity 502 also includes memory 506. The memory 506 may be any electronic component capable of storing electronic information. The memory 506 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 508 and instructions 510 may be stored in the memory 506. The instructions 510 may be executable by the processor 504 to implement various functions, which will be described below. Executing the instructions 510 may involve the use of the data 508 that is stored in the memory 506.

The network entity 502 may also include a transmitter 512 and a receiver 514 to allow transmission and reception of data between the network entity 502 and a remote location. The transmitter 512 and receiver 514 may be collectively referred to as a transceiver 516. An antenna 518 may be electrically coupled to the transceiver 516. The network entity 502 may also include (not shown) multiple transmitters 512, multiple receivers 514, multiple transceivers 516 and/or multiple antenna 518.

The various components of the network entity 502 may be coupled together by one or more buses, which may include a power bus, a control signal bus, a status signal bus, a data bus, etc. For the sake of clarity, the various buses are illustrated in FIG. 5 as a bus system 520.

The network entity 502 may be configured to communicate via a wireless communication network that supports the IEEE 802.16 standard (i.e., WiMAX). The data 508 stored in the memory 506 may include data 522 that facilitates communication in accordance with the IEEE 802.16 standard. Similarly, the instructions 510 stored in the memory 506 may include instructions 524 that facilitate communication in accordance with the IEEE 802.16 standard.

The data 508 in the memory 506 may include priority information 526. The priority information 526 may include device priority categories 528. Two device priority categories 528 are shown in FIG. 5, namely an emergency category 530 and a non-emergency category 532. Emergency devices (e.g., devices that are operated by emergency personnel) may be assigned to the emergency category 530. Devices other than emergency devices may be assigned to the non-emergency category 532.

Alternatively, there may be more than two device priority categories 528. For example, multiple emergency categories 530 and/or multiple non-emergency categories 532 may be defined.

Also, the emergency category 530 and the non-emergency category 532 are provided for purposes of example only. In general, the device priority categories 528 may include one or more high priority categories, and one or more low priority categories. The emergency category 530 is one example of a high priority category, and the non-emergency category 532 is one example of a low priority category. However, other types of high priority and low priority categories may be used.

The priority information 526 may also include service priority categories 534. Two service priority categories 534 are shown in FIG. 5, namely an emergency category 536 and a non-emergency category 538. Service requests that are associated with emergency situations (e.g., 911 phone calls) may be assigned to the emergency category 536. Service requests that are not associated with emergency situations may be assigned to the non-emergency category 538.

Alternatively, there may be more than two service priority categories 534. For example, multiple emergency categories 536 and/or multiple non-emergency categories 538 may be defined.

Also, the emergency category 536 and the non-emergency category 538 are provided for purposes of example only. In general, the service priority categories 534 may include one or more high priority categories, and one or more low priority categories. The emergency category 536 is one example of a high priority category, and the non-emergency category 538 is one example of a low priority category. However, other types of high priority and low priority categories may be used.

The instructions 510 in the memory 506 may include instructions 540 for handling service requests from subscriber stations 106. The instructions 510 in the memory 506 may also include instructions 542 for activating/deactivating admission control within the subscriber stations 106.

Figure 6:
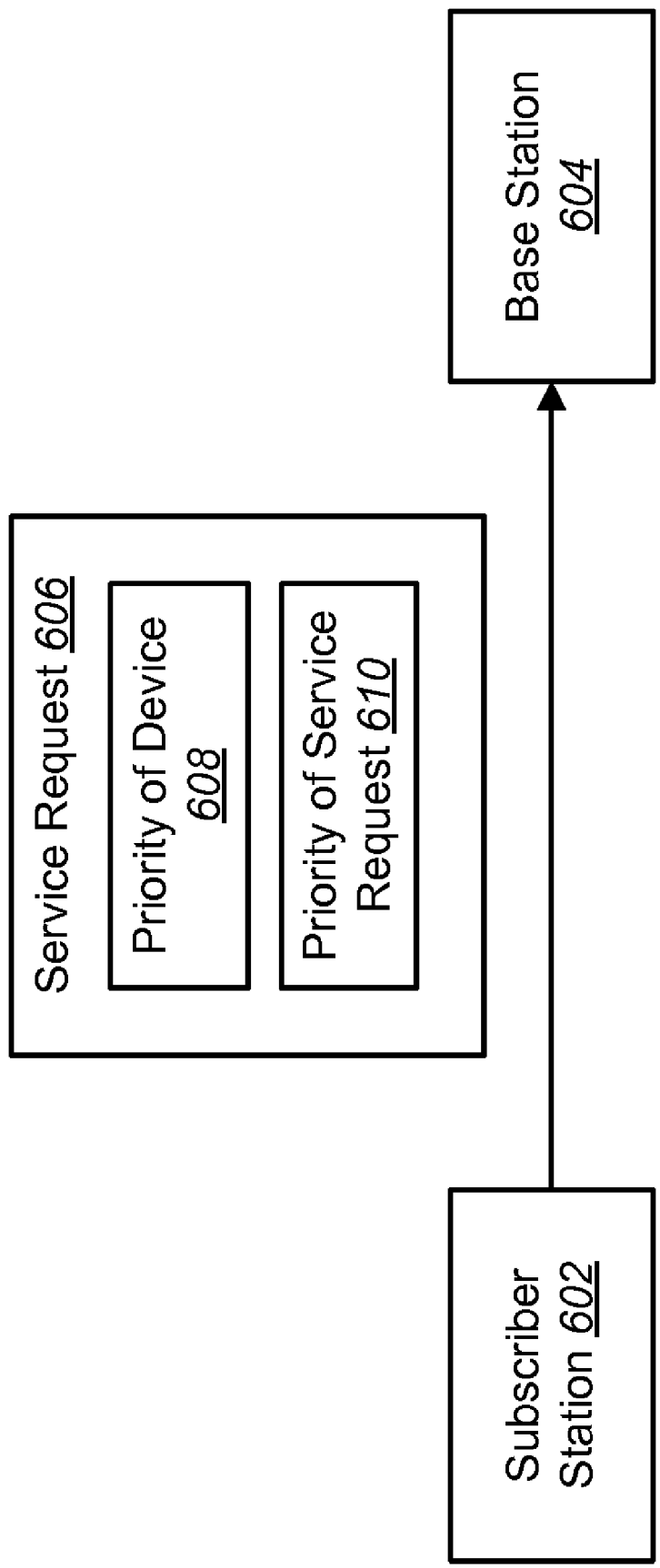
FIG. 6 illustrates an example of communication that may occur between a subscriber station and a base station.

FIG. 6 illustrates an example of communication that may occur between a subscriber station 602 and a base station 604. More specifically, FIG. 6 illustrates a subscriber station 602 sending a service request 606 to a base station 604. The service request 606 may include the priority 608 of the device that is sending the request 606. For example, the service request 606 may indicate whether the device that is sending the request 606 belongs to the emergency category 530 or the non-emergency category 532. The service request 606 may also include the priority 610 of the request 606 itself. For example, the service request 606 may indicate whether the request 606 belongs to the emergency category 536 or the non-emergency category 538.

Figure 7:
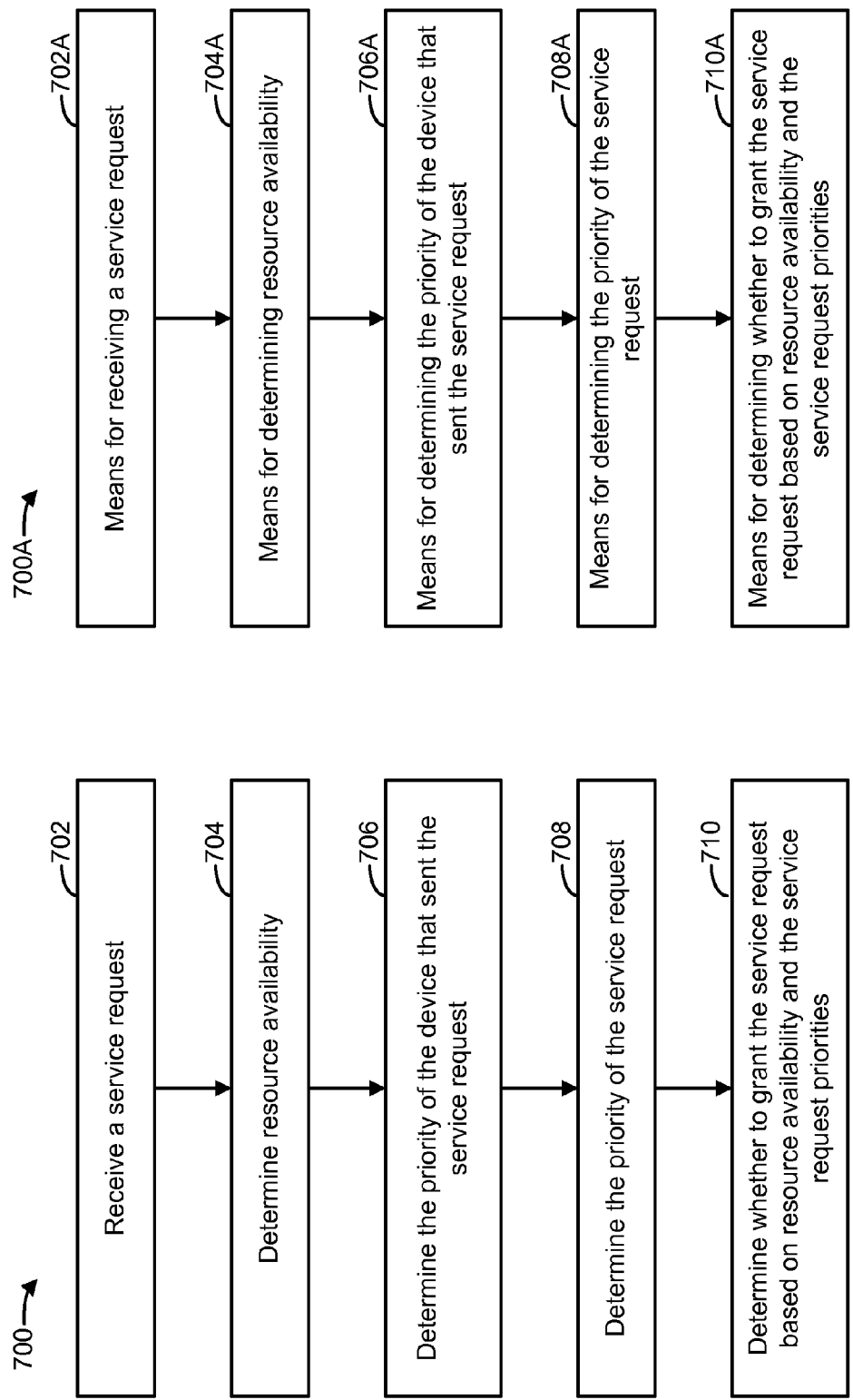
FIG. 7 illustrates an example of a method for processing service requests from subscriber stations.

FIG. 7 illustrates an example of a method 700 for processing service requests 606 from subscriber stations 602. The network entity 502 may implement the depicted method 700. For example, the processor 504 of the network entity 502 may execute the service request handling instructions 540 that are stored in the memory 506 of the network entity 502 to implement the depicted method 700.

The method 700 may include receiving 702 a service request 606. The method 700 may also include determining 704 resource availability. In this context, the term resource availability refers to the extent to which the resources of a wireless communication network 100 are being utilized, e.g., the level of congestion of the wireless communication network 100.

The method 700 may also include determining 706 the priority 608 of the device that sent the service request 606. This may be done by identifying the device priority category 528 to which the device that sent the service request 606 belongs.

The method 700 may also include determining 708 the priority 610 of the service request 606 itself. This may be done by identifying the service priority category 534 to which the service request 606 belongs.

The method 700 may also include determining 710 whether to grant the service request 606 based on the resource availability and the priorities associated with the service request 606 (e.g., the priority 608 of the device that sent the service request 606 and the priority 610 of the service request 606 itself).

The method 700 of FIG. 7 described above may be performed by various hardware and/or software component(s) and/or module(s) corresponding to the means-plus-function blocks 700A illustrated in FIG. 7A. In other words, blocks 702 through 710 illustrated in FIG. 7 correspond to means-plus-function blocks 702A through 710A illustrated in FIG. 7A.

Figure 8:
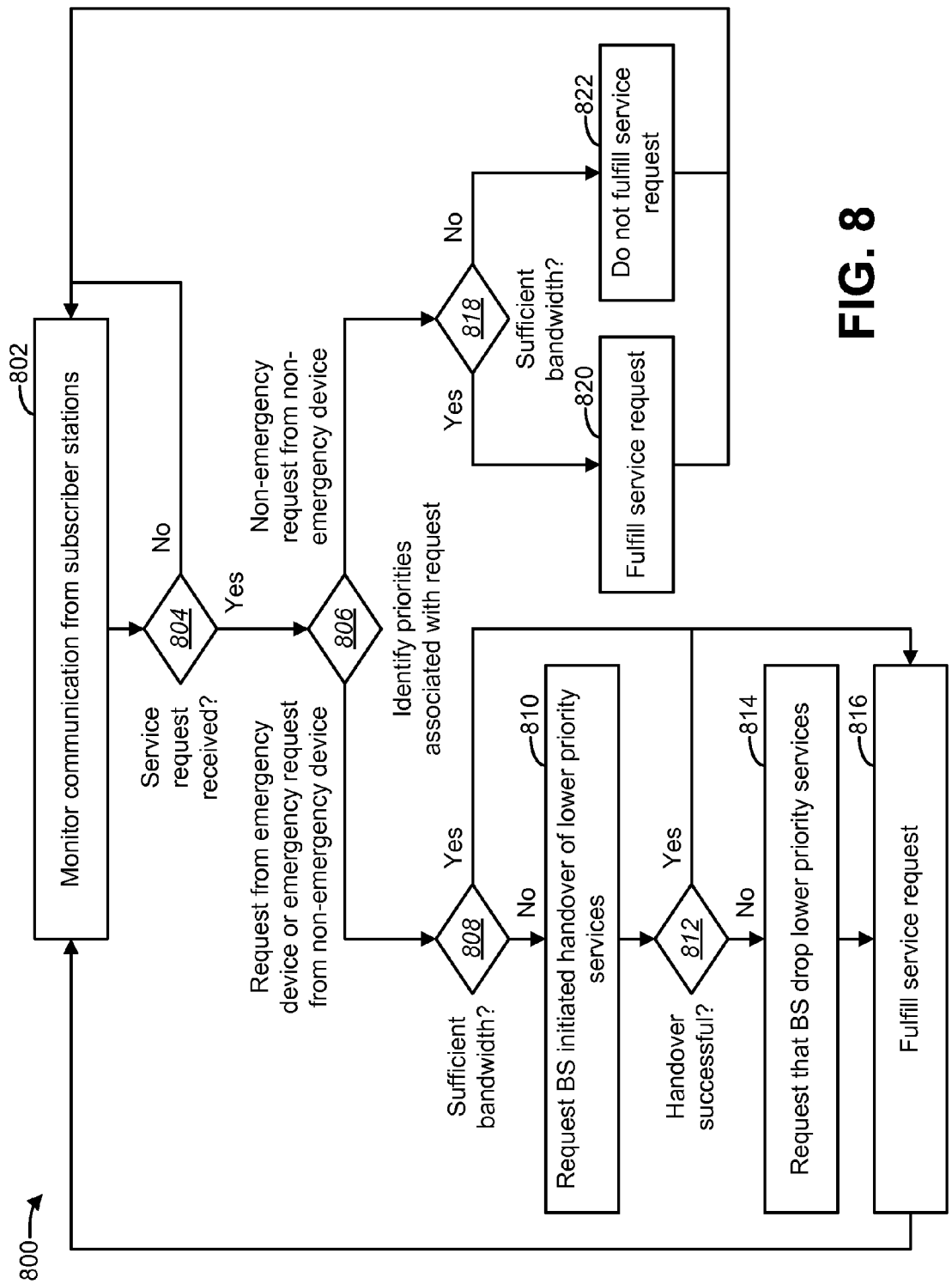
FIG. 8 illustrates another example of a method for processing service requests from subscriber stations.

FIG. 8 illustrates another example of a method 800 for processing service requests 606 from subscriber stations 602. The depicted method 800 is an example of a more detailed implementation of the method 700 of FIG. 7. The network entity 502 may implement the depicted method 800. For example, the processor 504 of the network entity 502 may execute the service request handling instructions 540 that are stored in the memory 506 of the network entity 502 to implement the depicted method 800.

The method 800 may include monitoring 802 communication from subscriber stations 602. If it is determined 804 that a service request 606 has been received, then one or more priorities associated with the service request 606 may be identified 806. For example, the priority 608 of the device that sent the service request 606 and the priority 610 of the service request 606 itself may be identified 806.

The service request 606 may be sent from an emergency device (e.g., a device that is assigned to the emergency category 530), or the service request 606 may be an emergency request from a non-emergency device (e.g., the service request 606 is assigned to the emergency category 536, even if the device is assigned to the non-emergency category 532). The processing of such a service request 606 will be described first.

Initially, it may be determined 808 whether there is currently sufficient network bandwidth to fulfill the service request 606. If there is, then the service request 606 may be fulfilled 816 without making any adjustments to the way in which network resources are presently allocated.

However, if it is determined 808 that there is not sufficient network bandwidth to fulfill the service request 606, then the method 800 may include requesting 810 that the base station 604 initiate handover of lower priority services. If it is determined 812 that the handover of lower priority services is successful, then the service request 606 may be fulfilled 816.

However, if it is determined 812 that the handover of lower priority services is not successful, then the method 800 may include requesting 814 that the base station 604 drop lower priority services. The service request 606 may then be fulfilled 816.

Thus, FIG. 8 illustrates an example of a network entity 502 determining that there is insufficient network bandwidth for a high-priority service request 606 (e.g., a service request 606 from an emergency device or an emergency request from a non-emergency device), and then requesting that a base station 606 take at least one action to reduce network congestion (e.g., handing over and/or dropping lower priority services).

Alternatively, the service request 606 may be a non-emergency request (e.g., the service request 606 is assigned to the non-emergency category 538) from a non-emergency device (e.g., a device that is assigned to the non-emergency category 532). The processing of such a service request 606 will now be described.

It may be determined 818 whether there is currently sufficient network bandwidth to fulfill the service request 606. If there is, then the service request 606 may be fulfilled 820. However, if there is not sufficient bandwidth to fulfill the service request 606, then the request 606 may not be fulfilled 822.

Figure 8A:
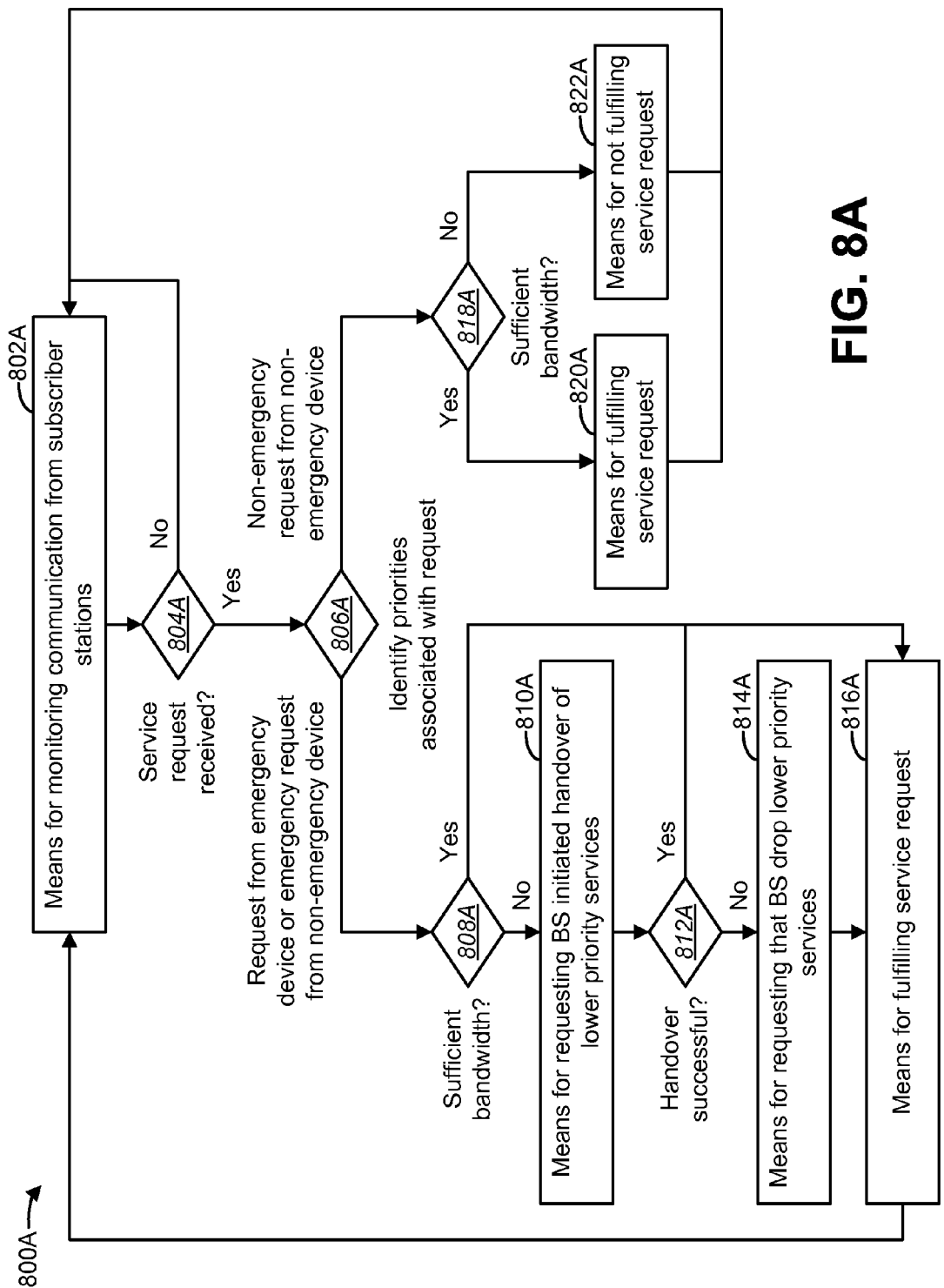
FIG. 8A illustrates means-plus-function blocks corresponding to the method of FIG. 8.

The method 800 of FIG. 8 described above may be performed by various hardware and/or software component(s) and/or module(s) corresponding to the means-plus-function blocks 800A illustrated in FIG. 8A. In other words, blocks 802 through 822 illustrated in FIG. 8 correspond to means-plus-function blocks 802A through 822A illustrated in FIG. 8A.

FIG. 9 illustrates an example of a method 900 for activating/deactivating admission control within subscriber stations 602. The network entity 502 may implement the depicted method 900. For example, the processor 504 of the network entity 502 may execute the activation/deactivation instructions 542 to implement the depicted method 900.

The method 900 may include monitoring 902 network activity. If it is determined 904 that the network is congested, the method 900 may include sending 906 a broadcast message to non-emergency devices (e.g., devices that are assigned to the non-emergency category 532) with an instruction to start subscriber station-based admission control.

The method 900 may include continuing to monitor 908 network activity. If it is determined 910 that the network is no longer congested, then the method 900 may include sending 912 a broadcast message to non-emergency devices with an instruction to discontinue subscriber station-based admission control.

The method 900 of FIG. 9 described above may be performed by various hardware and/or software component(s) and/or module(s) corresponding to the means-plus-function blocks 900A illustrated in FIG. 9A. In other words, blocks 902 through 912 illustrated in FIG. 9 correspond to means-plus-function blocks 902A through 912A illustrated in FIG. 9A.

Figure 10:
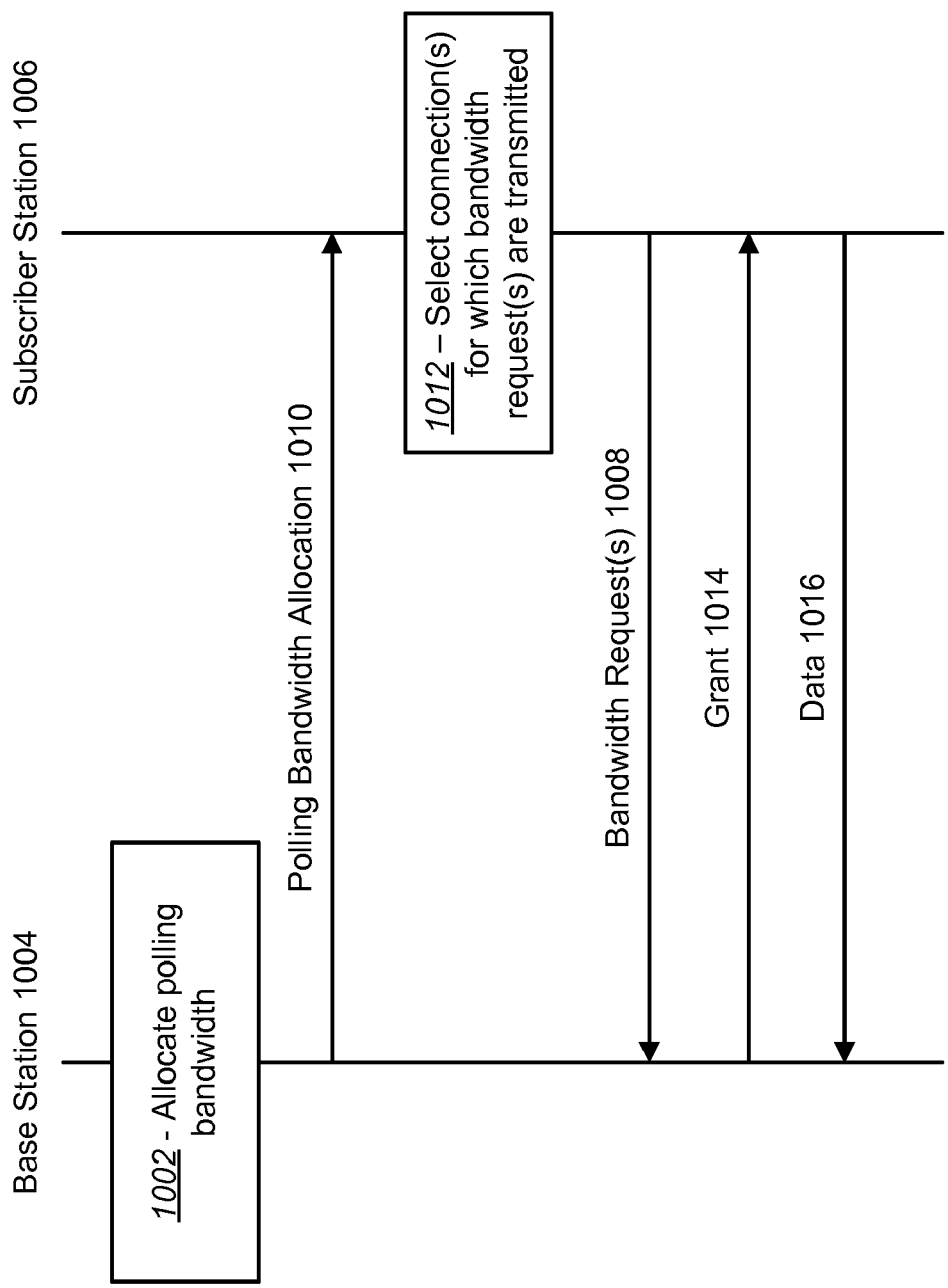
FIG. 10 illustrates examples of various functions that may be performed by a base station and a subscriber station, and communication that may occur between a base station and a subscriber station.

FIG. 10 illustrates examples of various functions that may be performed by a base station 1004 and a subscriber station 1006. FIG. 10 also illustrates examples of certain types of communication that may occur between the base station 1004 and the subscriber station 1006.

The base station 1004 may allocate 1002 polling bandwidth to a subscriber station 1006. The polling bandwidth is the bandwidth that is used by the subscriber station 1006 for sending bandwidth requests 1008 to the base station 1004. The base station 1004 may communicate the polling bandwidth allocation 1010 to the subscriber station 1006. For example, the base station 1004 may indicate the basic connection identifier (CID) of the subscriber station 1006 in the UL-MAP 336.

The subscriber station 1006 may select 1012 one or more connections for which bandwidth requests 1008 are transmitted, so that the polling bandwidth allocation 1010 is utilized but not exceeded. The subscriber station 1006 may then transmit one or more bandwidth requests 1008 to the base station 1004.

Based on the bandwidth requests 1008 that are received, the base station 1004 may provide one or more grants 1014 of uplink bandwidth to the subscriber station 1006. The subscriber station 1006 may transmit data 1016 to the base station 1004 in accordance with the grants 1014 that are received.

Figure 11:
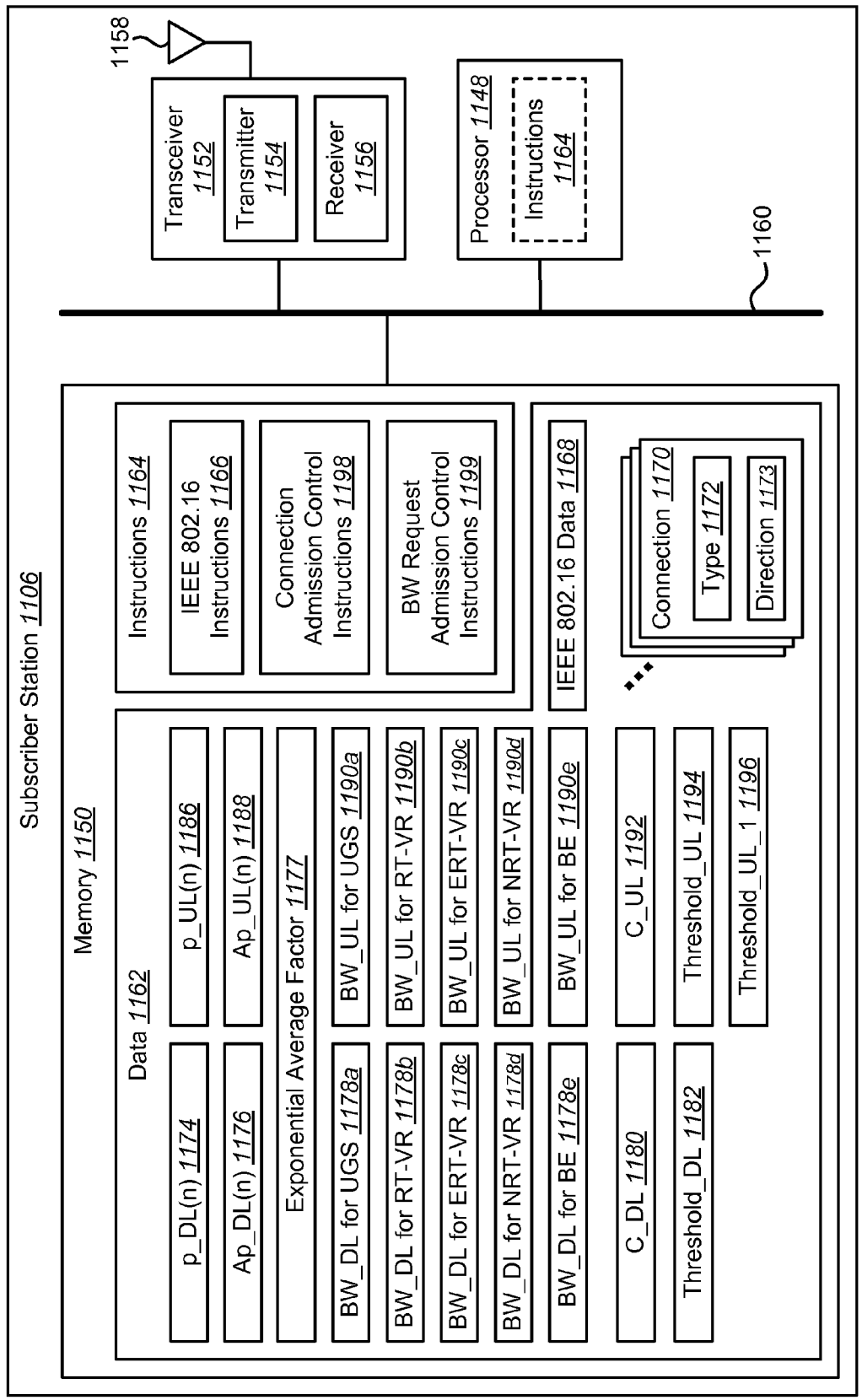
FIG. 11 illustrates an example of a subscriber station that is configured to implement admission control.

FIG. 11 illustrates an example of a subscriber station 1106 that is configured to implement admission control. The subscriber station 1106 includes a processor 1148. The processor 1148 may be a general purpose single- or multi-chip microprocessor (e.g., an ARM), a special purpose microprocessor (e.g., a digital signal processor (DSP)), a microcontroller, a programmable gate array, etc. The processor 1148 may be referred to as a central processing unit (CPU). Although just a single processor 1148 is shown in the subscriber station 1106 of FIG. 11, in an alternative configuration, a combination of processors 1148 (e.g., an ARM and DSP) could be used.

The subscriber station 1106 also includes a memory 1150. The memory 1150 may be any electronic component capable of storing electronic information. The memory 1150 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Instructions 1164 and data 1162 may be stored in the memory 1150. The instructions 1164 may be executable by the processor 1148 to implement various functions, which will be described below. Executing the instructions 1164 may involve the use of the data 1162 that is stored in the memory 1150.

The subscriber station 1106 may also include a transmitter 1154 and a receiver 1156 to allow transmission and reception of data between the subscriber station 1106 and a base station 104. The transmitter 1154 and receiver 1156 may be collectively referred to as a transceiver 1152. An antenna 1158 may be electrically coupled to the transceiver 1152. The subscriber station 1106 may also include (not shown) multiple transmitters 1154, multiple receivers 1156, multiple transceivers 1152 and/or multiple antenna 1158.

The various components of the subscriber station 1106 may be coupled together by one or more buses, which may include a power bus, a control signal bus, a status signal bus, a data bus, etc. For the sake of clarity, the various buses are illustrated in FIG. 11 as a bus system 1160.

The subscriber station 1106 may be configured to communicate via a wireless communication network that supports the IEEE 802.16 standard (i.e., WiMAX). The instructions 1164 stored in the memory 1150 may include instructions 1166 that facilitate communication in accordance with the IEEE 802.16 standard. Similarly, the data 1162 stored in the memory 1150 may include data 1168 that facilitates communication in accordance with the IEEE 802.16 standard.

The data 1162 in the memory 1150 may include information about the active connections 1170 that are currently maintained by the subscriber station 1106. The information that is maintained about the connections 1170 may include the data delivery service types 1172 and direction 1173 (either downlink 108 or uplink 110) of the various connections 1170. The following data delivery service types 1172 for transport connections are defined in the IEEE 802.16 standard: UGS (unsolicited grant service), ERT-VR (extended real-time variable rate), RT-VR (real-time variable rate), NRT-VR (non-real-time variable rate), and BE (best effort).

The unsolicited grant service is designed to support fixed-size data packets at a constant bit rate. The real-time variable rate is designed to support real-time service flows (e.g., streaming video). The non-real-time variable rate is designed to support delay-tolerant data streams that require variable-size data grants at a minimum guaranteed rate (e.g., FTP). The best-effort service is designed to support data streams that do not require a minimum service-level guarantee (e.g., web browsing). The extended real-time variable rate is designed to support real-time applications that have variable data rates but require guaranteed data rate and delay (e.g., voice over IP with silence suppression).

The data 1162 in the memory 1150 may include a parameter 1174 that indicates the percentage of the slots 224 in the current downlink sub-frame 216 that are allocated for transmission. This parameter 1174 may be referred to herein as p_DL(n) 1174, where n indicates the current downlink sub-frame 216. This parameter p_DL(n) 1174 may be determined by reading the DL-MAP message 332.

The data 1162 in the memory 1150 may also include a parameter 1176 that indicates the average percentage of slots 224 per downlink sub-frame 216 that are being allocated for transmission. This parameter 1176 may be referred to herein as Ap_DL(n) 1176. Ap_DL(n) 1176 may be determined as:

$$Ap\_DL(n) = a * p\_DL(n) + (1-a) * Ap\_DL(n-1) \tag{1}$$

The term a is an exponential average factor 1177. The exponential average factor 1177 may depend on the extent to which the current downlink sub-frame 216 or uplink sub-frame 218 should be weighted relative to the previous downlink sub-frame 216 or uplink sub-frame 218. The exponential average factor 1177 may depend on whether the subscriber station 1106 is mobile or stationary, how fast the subscriber station 1106 is moving (if the subscriber station 1106 is mobile), etc. The exponential average factor 1177 may be included among the data 1162 that is stored in the memory 1150.

In the above example, Ap_DL(n) 1176 was determined based on the percentage of slots 224 that are allocated for transmission in the current downlink sub-frames 216(n) and the average percentage of slots of the previous downlink sub-frame 216(n−1). However, Ap_DL(n) 1176 may be determined based on the percentage of slots 224 that are allocated for transmission in more than two downlink sub-frames 216. In this case, the data 1162 in the memory 1150 may store additional parameters 1174 that indicate the percentage of the slots 224 that are allocated for transmission in multiple previous downlink sub-frames 216 (e.g., n, n−1, n−2, n−3, . . . etc.). The general formula Ap_DL(n) 1176 may be determined as:

$$Ap\_DL(n) = a0 * p\_DL(n) + a1 * p\_DL(n-1) + a2 * p\_DL(n-2) + \tag{1a}$$
$$\ldots + b1 * Ap\_DL(n-1) + b2 * Ap\_DL(n-2) + \ldots$$

The data 1162 in the memory 1150 may also include QoS parameters 1178 that indicate the downlink bandwidth demand for connections 1170 of various data delivery service types 1172. These bandwidth related QoS parameters 1178 may be referred to as BW_DL 1178. The BW_DL 1178a for a UGS data delivery type 1172 may be equal to the Maximum Sustained Traffic Rate. The BW_DL 1178b for a RT-VR data delivery type 1172 may also be equal to the Maximum Sustained Traffic Rate. The BW_DL 1178c for an ERT-VR data delivery type 1172 may also be equal to the Maximum Sustained Traffic Rate. The BW_DL 1178d for a NRT-VR data delivery type 1172 may be equal to the Minimum Reserved Traffic Rate. The BW_DL 1178e for a BE data delivery type 1172 may be equal to zero, as there is no need to reserve bandwidth.

The Maximum Sustained Traffic Rate and the Minimum Reserved Traffic Rate are QoS parameters that may be provisioned in the subscriber station 1106. When a connection 1170 is set up, the higher layer can indicate to the WiMAX protocol layer the attributes of the connection 1170, such as the direction (either downlink 108 or uplink 110), the data delivery service type (UGS, RT-VR, ERT-VR, NRT-VR, or BE), QoS parameters, etc.

The data 1162 in the memory 1150 may also include a parameter 1180 that indicates the downlink air-interface capacity. This parameter 1180 may be referred to as C_DL 1180. C_DL 1180 may be pre-provisioned in the subscriber station 1106.

The data 1162 in the memory 1150 may also include a parameter 1182 that indicates a threshold value corresponding to the downlink 108 that may be used in determining whether new connections 1170 should be admitted. This parameter 1182 may be referred to as Threshold_DL 1182. Threshold_DL 1182 may be pre-provisioned in the subscriber station 1106.

The data 1162 in the memory 1150 may also include a parameter 1186 that indicates the percentage of the slots 224 in the current uplink sub-frame 218 that are allocated for transmission. This parameter 1186 may be referred to herein as p_UL(n) 1186, where n indicates the current uplink sub-frame 218. This parameter p_UL(n) 1186 may be determined by reading the UL-MAP message 336.

The data 1162 in the memory 1150 may also include a parameter 1188 that indicates the average percentage of slots 224 per uplink sub-frame 218 that are being allocated for transmission. This parameter 1188 may be referred to herein as Ap_UL(n) 1188. Ap_UL(n) 1188 may be determined as:

$$Ap\_UL(n) = a * p\_UL(n) + (1-a) * Ap\_UL(n-1) \tag{2}$$

The term a is the exponential average factor 1177. In the above example, Ap_UL(n) 1188 was determined based on the percentage of slots 224 that are allocated for transmission in the current uplink sub-frame 218(n) and the average percentage of slots of the previous uplink sub-frame 218(n−1). However, Ap_UL(n) 1188 may be determined based on the percentage of slots 224 that are allocated for transmission in more than two uplink sub-frames 218. In this case, the data 1162 in the memory 1150 may store additional parameters 1188 that indicate the percentage of the slots 224 that are allocated for transmission in multiple previous uplink sub-frames 218 (e.g., n, n−1, n−2, n−3, . . . etc.). The general formula Ap_UL(n) 1176 may be determined as:

$$Ap\_UL(n) = c0 * p\_UL(n) + c1 * p\_UL(n-1) + c2 * p\_UL(n-2) + \tag{2a}$$
$$\ldots + d1 * Ap\_UL(n-1) + d2 * Ap\_UL(n-2) + \ldots$$

The data 1162 in the memory 1150 may also include parameters 1190 that indicate the uplink bandwidth demand for connections 1170 of various data delivery service types 1172. These parameters 1190 may be referred to as BW_UL 1190. The BW_UL 1190a for a UGS type 1172 may be equal to the Maximum Sustained Traffic Rate. The BW_UL 1190b for a RT-VR type 1172 may also be equal to the Maximum Sustained Traffic Rate. The BW_UL 1190c for an ERT-VR type 1172 may also be equal to the Maximum Sustained Traffic Rate. The BW_UL 1190d for a NRT-VR type 1172 may be equal to the Minimum Reserved Traffic Rate. The BW_UL 1190e for a BE type 1172 may be equal to zero, as there is no need to reserve bandwidth.

The data 1162 in the memory 1150 may also include a parameter 1192 that indicates the uplink air-interface capacity. This parameter 1192 may be referred to as C_UL 1192. C_UL 1192 may be pre-provisioned in the subscriber station 1106.

The data 1162 in the memory 1150 may also include a parameter 1194 that indicates a threshold value corresponding to the uplink 110 that may be used in determining whether new connections 1170 should be admitted. This parameter 1194 may be referred to as Threshold_UL 1194. Threshold_UL 1194 may be pre-provisioned in the subscriber station 1106.

The data 1162 in the memory 1150 may also include a parameter 1196 that indicates a threshold value corresponding to the uplink 110 that may be used in determining whether new bandwidth requests 1008 should be transmitted. This parameter 1196 may be referred to as Threshold_UL_1 1196. Threshold_UL_1 1196 may be pre-provisioned in the subscriber station 1106.

The instructions 1164 in the memory 1150 may include instructions 1198 for performing admission control with respect to new connections 1170. The instructions 1164 in the memory 1150 may also include instructions 1199 for performing admission control with respect to bandwidth requests 1008.

Figure 12:
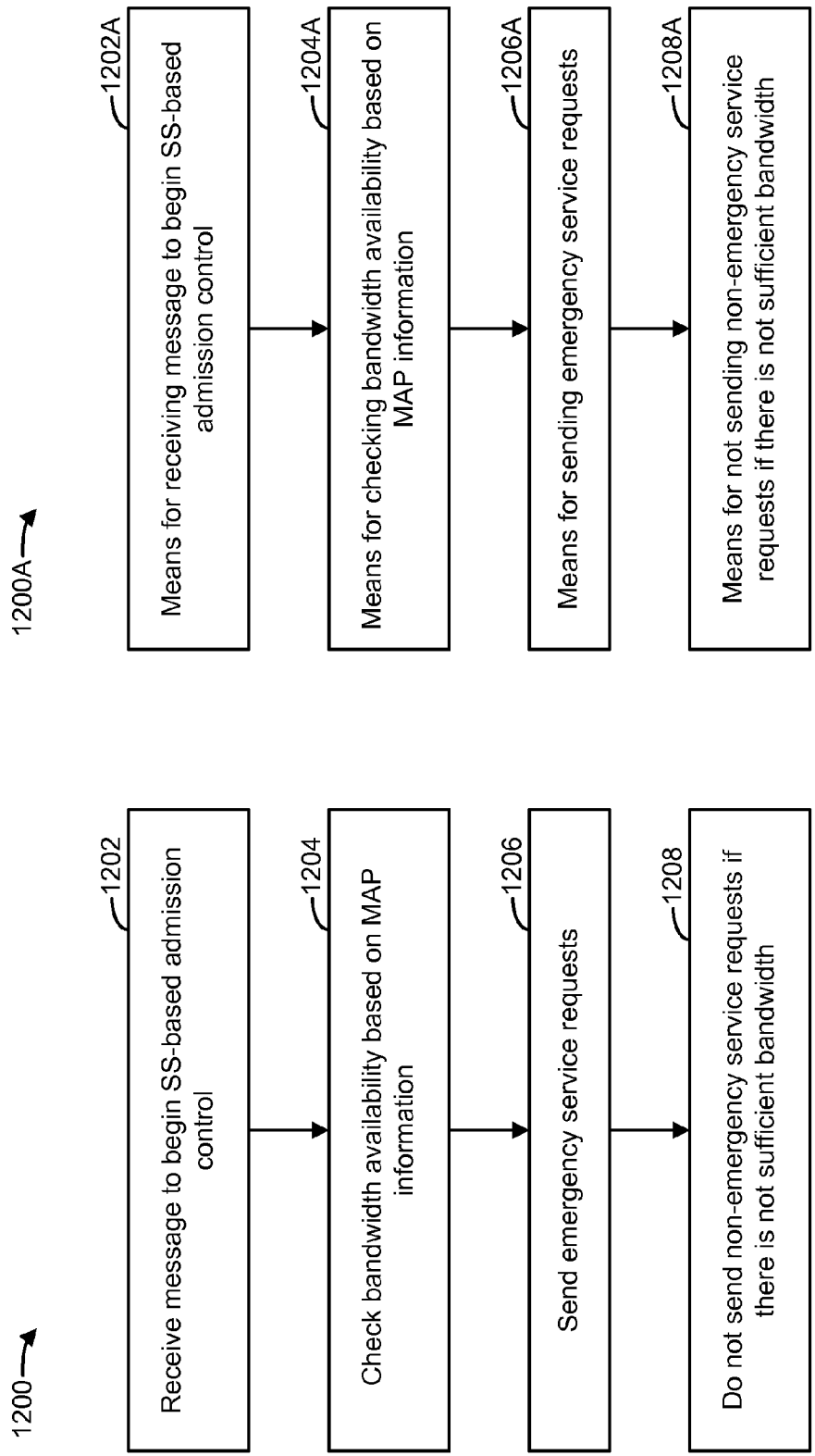
FIG. 12 illustrates an example of a method for subscriber station-based admission control.

FIG. 12 illustrates an example of a method 1200 for subscriber station-based admission control. The subscriber station 1106 may implement the depicted method 1200. For example, the processor 1148 of the subscriber station 1106 may execute the connection admission control instructions 1198 to implement the depicted method 1200. It may be assumed that the subscriber station 1106 that is implementing the method 1200 is a non-emergency device (e.g., a device that is assigned to the non-emergency category 532).

The method 1200 may include receiving 1202 a message from a network entity 502 to begin subscriber station-based admission control. The method 1200 may also include checking 1204 bandwidth availability based on MAP information (e.g., the DL-MAP 332 and the UL-MAP 336).

Even when the subscriber station 1106 is implementing admission control, the subscriber station 1106 may send 1206 emergency service requests 606 (e.g., service requests 606 that are assigned to the emergency category 536). However, when the subscriber station 1106 is implementing admission control, the subscriber station 1106 may not send 1208 non-emergency service requests 606 (e.g., service requests 606 that are assigned to the non-emergency category 538) if there is insufficient network bandwidth.

Thus, FIG. 12 illustrates an example of how a subscriber station 1106 may facilitate priority-based network congestion control by not sending low priority service requests 606 (e.g., service requests 606 that are assigned to the non-emergency category 538) when there is insufficient network bandwidth.

The method 1200 of FIG. 12 described above may be performed by various hardware and/or software component(s) and/or module(s) corresponding to the means-plus-function blocks 1200A illustrated in FIG. 12A. In other words, blocks 1202 through 1208 illustrated in FIG. 12 correspond to means-plus-function blocks 1202A through 1208A illustrated in FIG. 12A.

Figure 13:
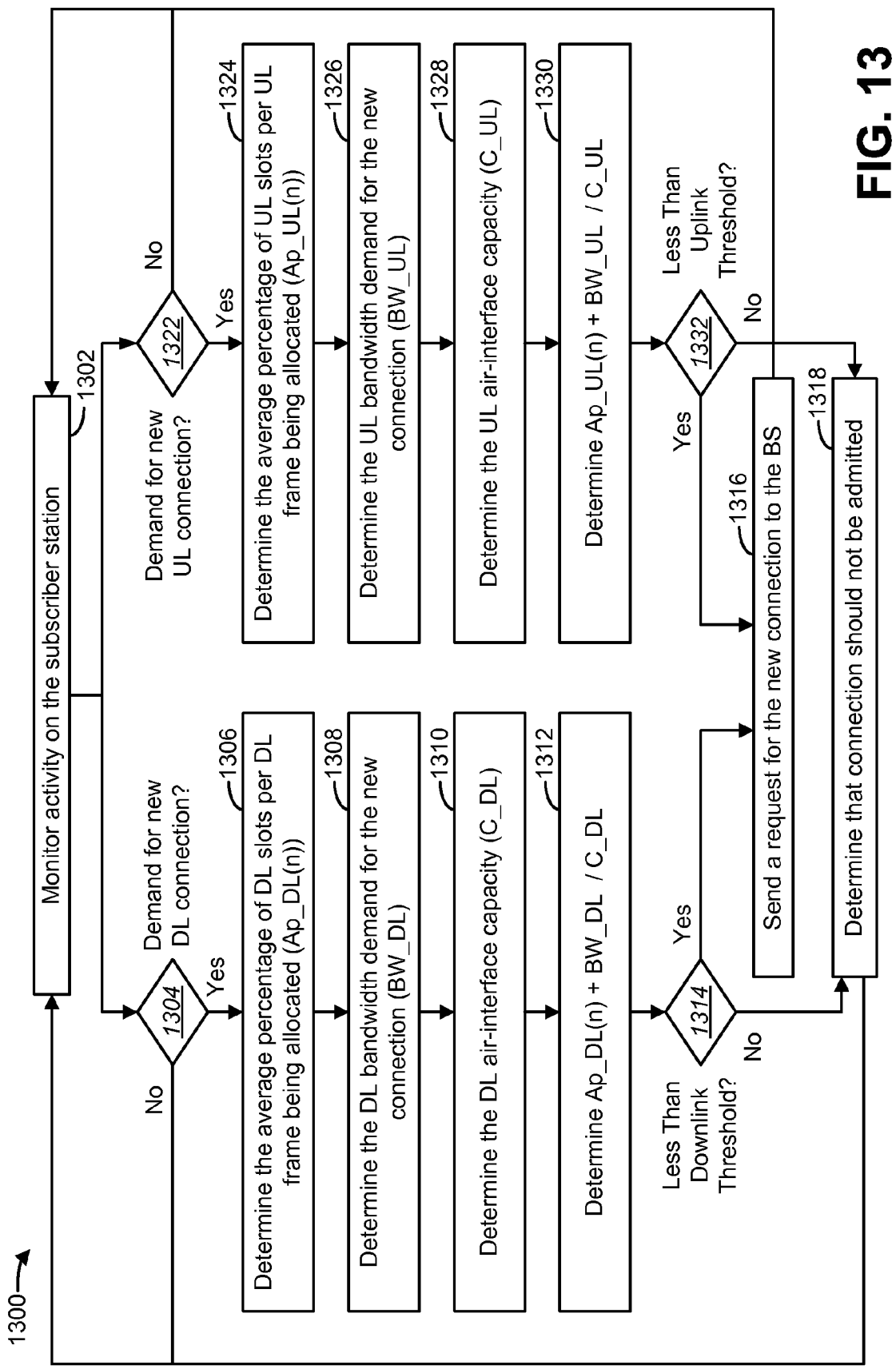
FIG. 13 illustrates an example of a method for performing admission control with respect to new connections.

FIG. 13 illustrates an example of a method 1300 for performing admission control with respect to new connections 1170. The subscriber station 1106 may implement the depicted method 1300. For example, the processor 1148 of the subscriber station 1106 may execute the connection admission control instructions 1198 that are stored in the memory 1150 of the subscriber station 1106 to implement the depicted method 1300.

The method 1300 may include monitoring 1302 activity on the subscriber station 1106. If it is determined 1304 that there is a demand for a new downlink connection 1170, the method 1300 may include determining 1306 the average percentage of slots 224 per downlink sub-frame 216 that are being allocated for transmission (i.e., Ap_DL(n) 1176). The method 1300 may also include determining 1308 the downlink bandwidth demand for the new connection 1170 (i.e., BW_DL 1178). The method 1300 may also include determining 1310 the downlink air-interface capacity (i.e., C_DL 1180).

The method 1300 may also include determining 1312 the value of the following expression:

$$Ap\_DL(n)+BW\_DL/C\_DL \qquad (3)$$

The value of equation (3) may then be compared to the downlink threshold (Threshold_DL) 1182. If it is determined 1314 that the value of equation (3) is less than Threshold_DL 1182, then the new connection 1170 should be admitted and a request may be sent 1316 to the base station 104 to set up this new connection. However, if it is determined 1314 that the value of equation (3) is not less than Threshold_DL 1182, then it may be determined 1318 that the new connection 1170 should not be admitted.

The method 1300 may include determining 1322 that there is a demand for a new uplink connection 1170. If it is determined 1322 that there is a demand for a new uplink connection 1170, the method 1300 may include determining 1324 the average percentage of slots 224 per uplink sub-frame 218 that are being allocated for transmission (i.e., Ap_UL(n) 1188). The method 1300 may also include determining 1326 the uplink bandwidth demand for the new connection 1170 (i.e., BW_UL 1190). The method 1300 may also include determining 1328 the uplink air-interface capacity (i.e., C_UL 1192).

The method 1300 may also include determining 1330 the value of the following expression:

$$Ap\_UL(n)+BW\_UL/C\_UL \qquad (4)$$

The value of equation (4) may then be compared to the uplink threshold (Threshold_UL) 1194. If it is determined 1332 that the value of equation (4) is less than Threshold_UL 1194, then the new connection 1170 should be admitted and a request may be sent 1316 to the base station 104 to set up this new connection. However, if it is determined 1332 that the value of equation (4) is not less than Threshold_UL 1194, then it may be determined 1318 that the new connection 1170 should not be admitted.

Thus, FIG. 13 illustrates an example of how a subscriber station 1106 may determine whether a new connection 1170 should be admitted based on resource availability. In this context, the term resource availability refers to the extent to which the resources of a wireless communication network 100 are being utilized, e.g., the level of congestion of the wireless communication network 100.

Figure 13A:
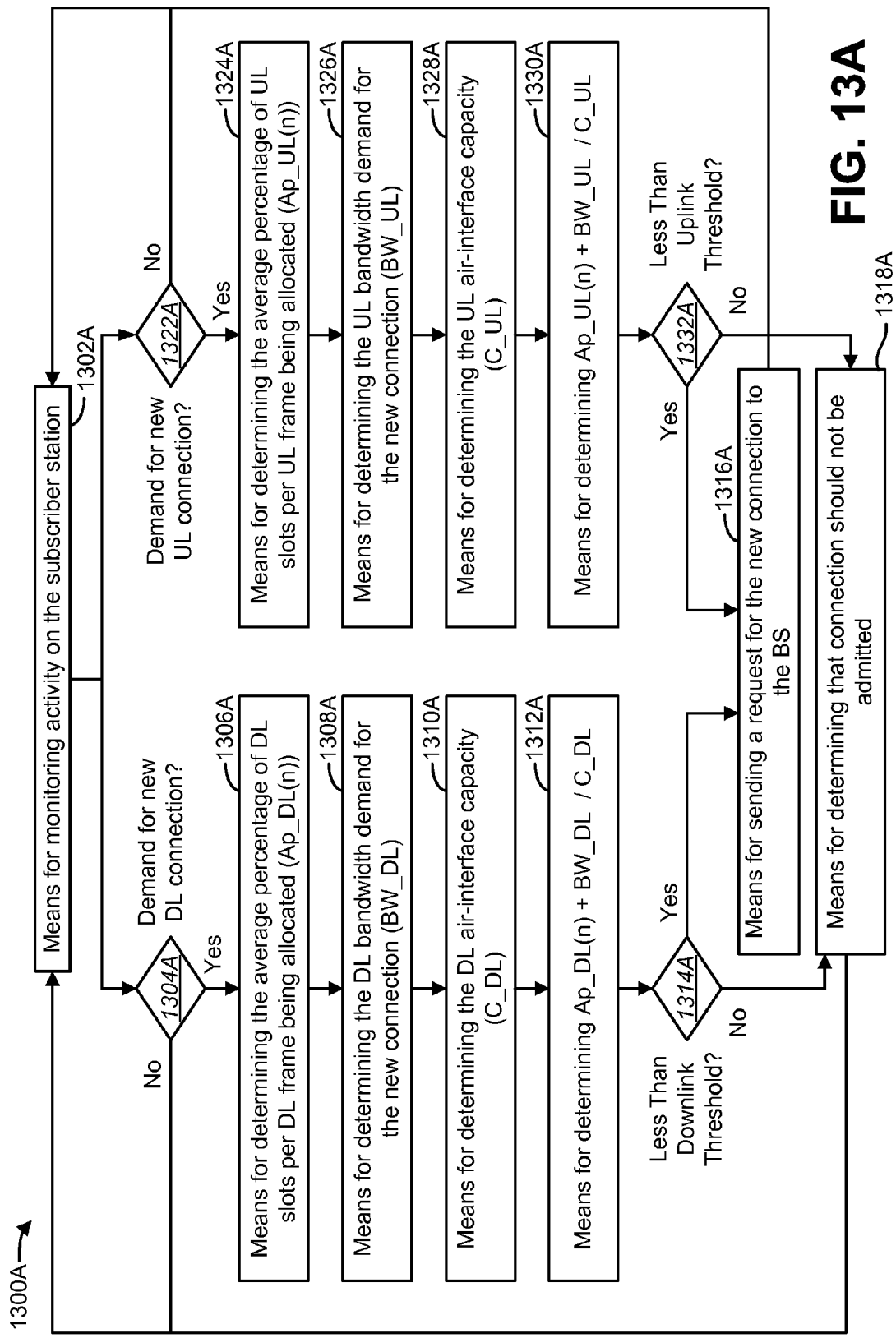
FIG. 13A illustrates means-plus-function blocks corresponding to the method of FIG. 13.

The method 1300 of FIG. 13 described above may be performed by various hardware and/or software component(s) and/or module(s) corresponding to the means-plus-function blocks 1300A illustrated in FIG. 13A. In other words, blocks 1302 through 1332 illustrated in FIG. 13 correspond to means-plus-function blocks 1302A through 1332A illustrated in FIG. 13A.

Figure 14:
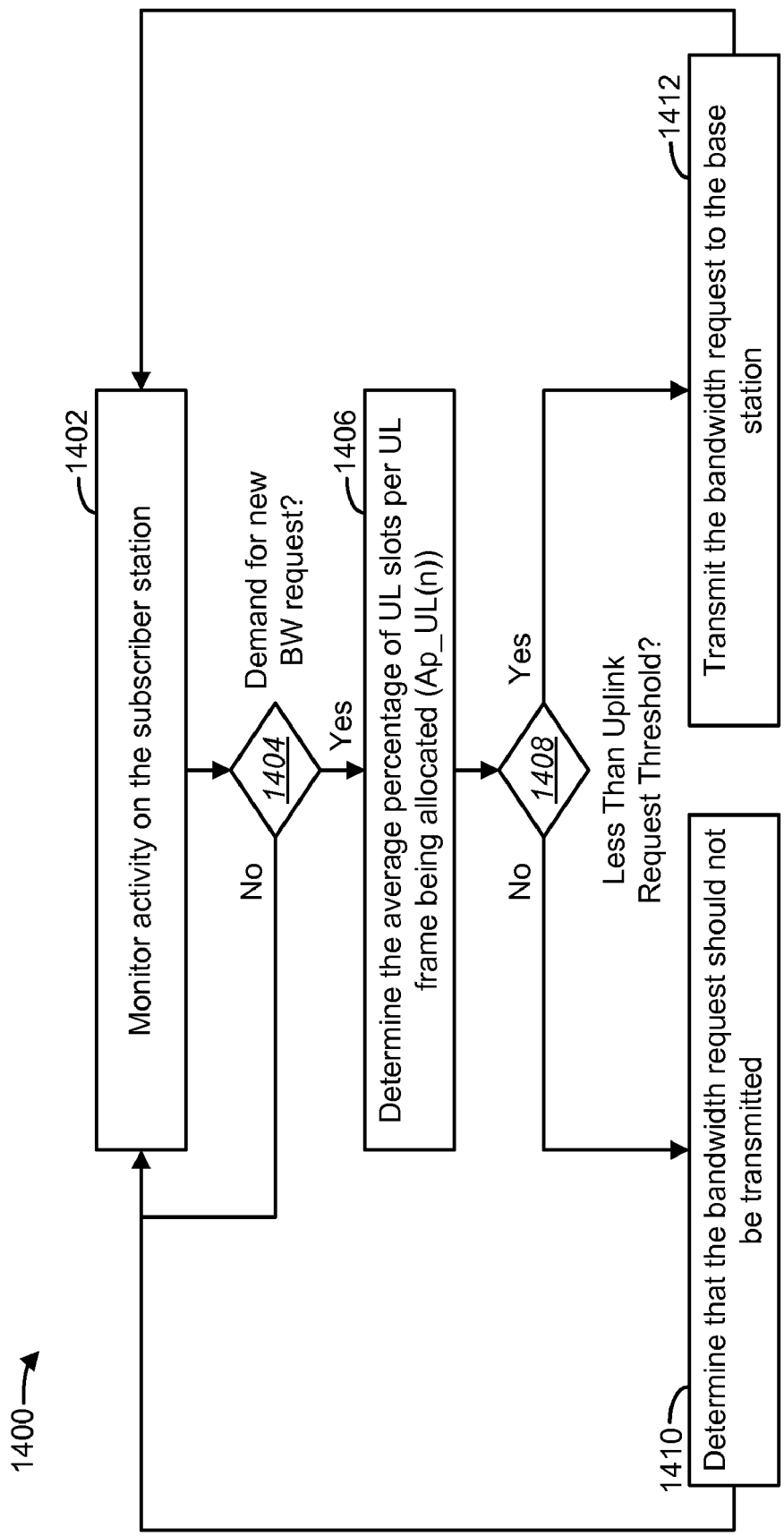
FIG. 14 illustrates a method for performing admission control with respect to new bandwidth requests.

FIG. 14 illustrates a method 1400 for performing admission control with respect to new bandwidth requests 1008. The subscriber station 1106 may implement the depicted method 1400. For example, the processor 1148 of the subscriber station 1106 may execute the bandwidth request admission control instructions 1199 that are stored in the memory 1150 of the subscriber station 1106 to implement the depicted method 1400.

The method 1400 may include monitoring 1402 activity on the subscriber station 1106. If it is determined 1404 that there is a demand for a new bandwidth request 1008, the method 1400 may include determining 1406 the average percentage of slots 224 per uplink sub-frame 218 that are being allocated for transmission (i.e., Ap_UL(n) 1188). The value of Ap_UL(n) 1188 may then be compared to the bandwidth request threshold (i.e., Threshold_UL_1 1196). If it is determined 1408 that Ap_UL(n) 1188 is greater than Threshold_UL_1 1196, then it may be determined 1410 that the bandwidth request 1008 should not be transmitted. However, if it is determined 1408 that Ap_UL(n) 1188 is less than Threshold_UL_1 1196, then it may be determined that the bandwidth request 1008 should be transmitted, and the bandwidth request 1008 may be transmitted 1412 to the base station 104.

Thus, FIG. 14 illustrates an example of how a subscriber station 1106 may determine whether a bandwidth request 1008 should be admitted based on resource availability. As indicated above, the term resource availability refers to the extent to which the resources of a wireless communication network 100 are being utilized, e.g., the level of congestion of the wireless communication network 100.

Figure 14A:
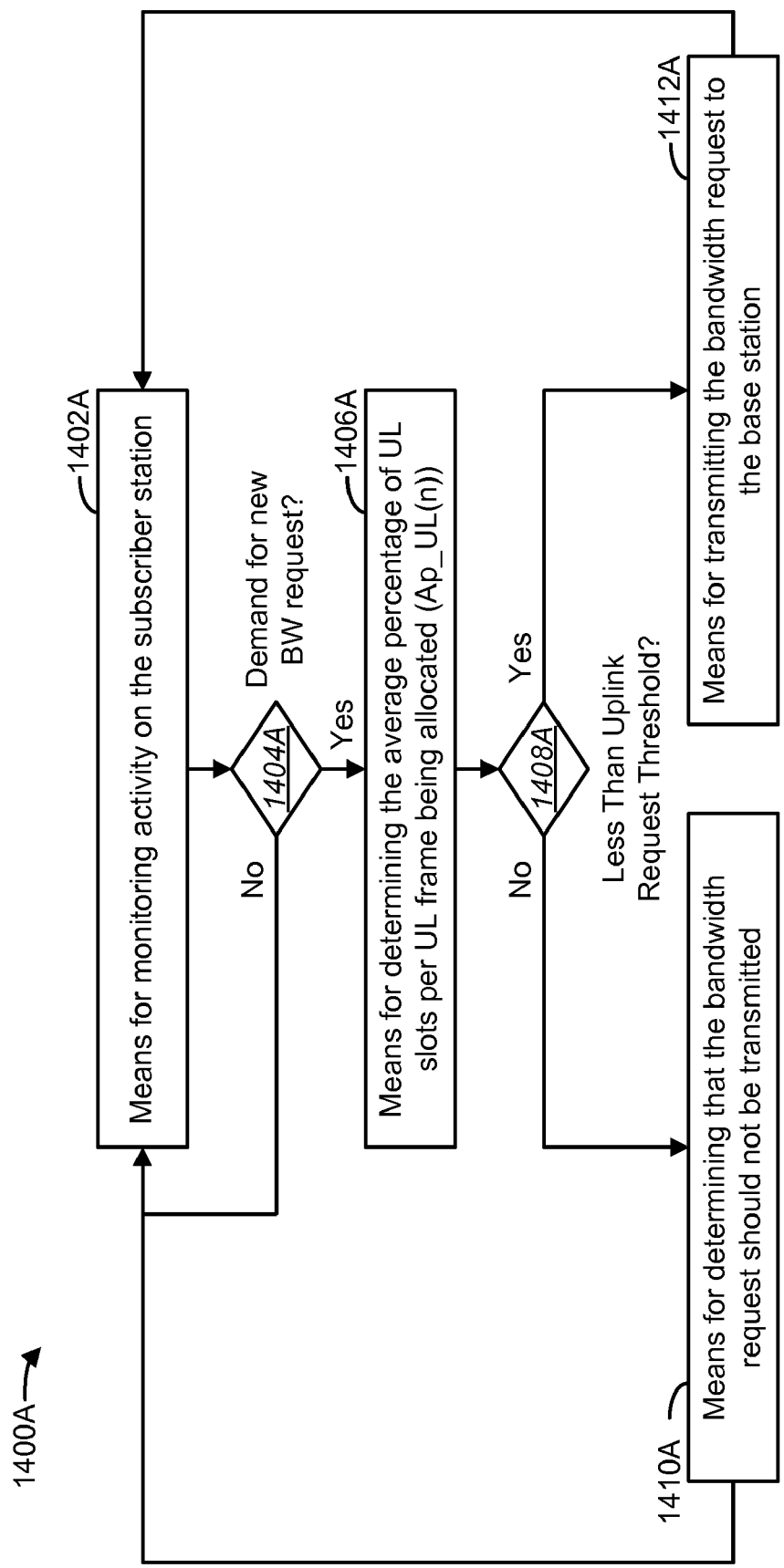
FIG. 14A illustrates means-plus-function blocks corresponding to the method of FIG. 14.

The method 1400 of FIG. 14 described above may be performed by various hardware and/or software component(s) and/or module(s) corresponding to the means-plus-function blocks 1400A illustrated in FIG. 14A. In other words, blocks 1402 through 1412 illustrated in FIG. 14 correspond to means-plus-function blocks 1402A through 1412A illustrated in FIG. 14A.

Figure 15:
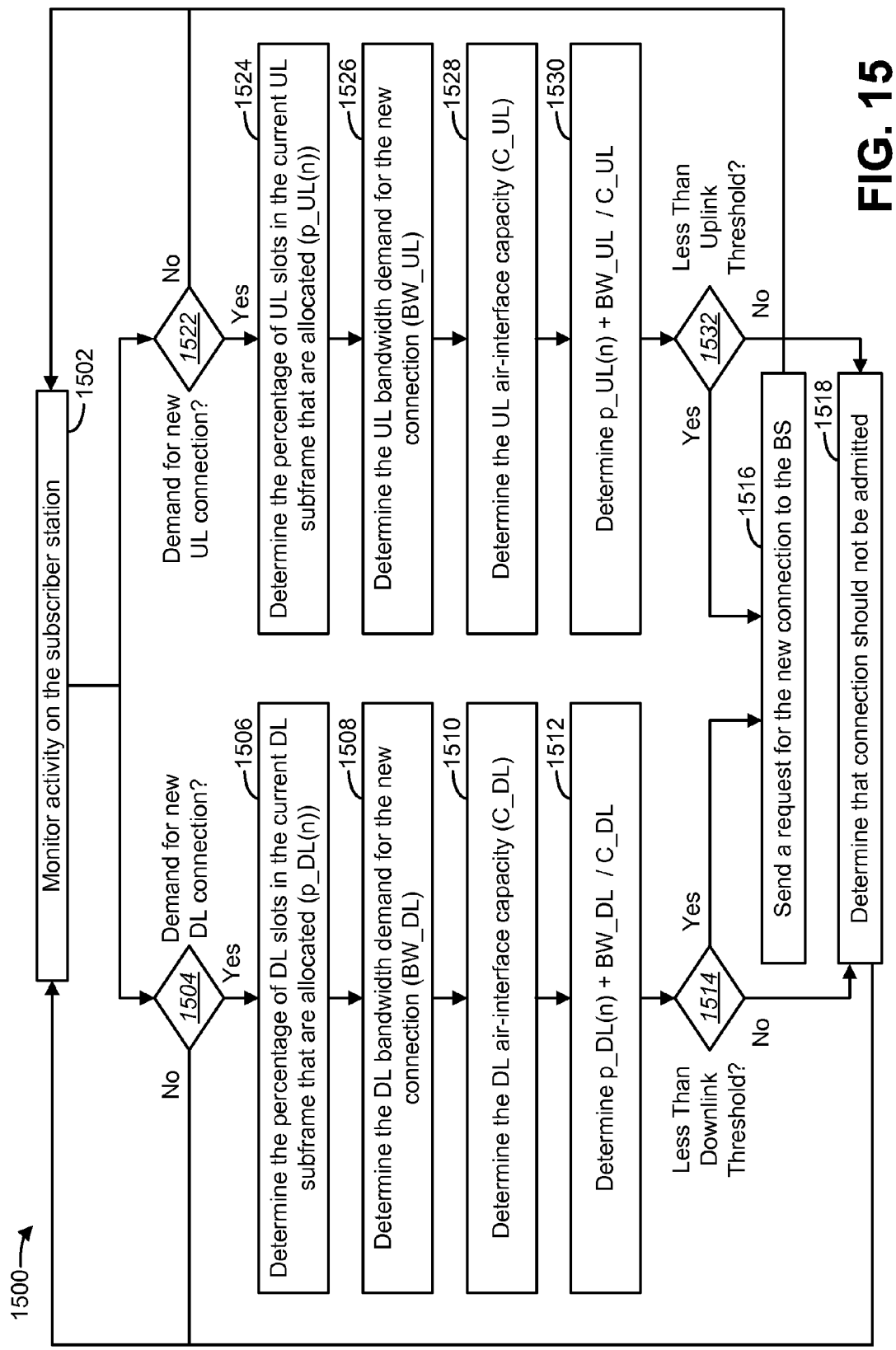
FIG. 15 illustrates an alternative example of a method for performing admission control with respect to new connections.

FIG. 15 illustrates an alternative method 1500 for performing admission control with respect to new connections 1170. The subscriber station 1106 may implement the depicted method 1500. For example, the processor 1148 of the subscriber station 1106 may execute the connection admission control instructions 1198 that are stored in the memory 1150 of the subscriber station 1106 to implement the depicted method 1500.

The method 1500 may include monitoring 1502 activity on the subscriber station 1106. If it is determined 1504 that there is a demand for a new downlink connection 1170, the method 1500 may include determining 1506 the percentage of slots 224 in the current downlink sub-frame 216 that are allocated for transmission (i.e., p_DL(n) 1174). The method 1500 may also include determining 1508 the downlink bandwidth demand for the new connection 1170 (i.e., BW_DL 1178). The method 1500 may also include determining 1510 the downlink air-interface capacity (i.e., C_DL 1180).

The method 1500 may also include determining 1512 the value of the following expression:

$$p\_DL(n)+BW\_DL/C\_DL \tag{5}$$

The value of equation (5) may then be compared to the downlink threshold (Threshold_DL) 1182. If it is determined 1514 that the value of equation (5) is less than Threshold_DL 1182, then the new connection 1170 should be admitted and a request may be sent 1516 to the base station 104 to set up this new connection 1516. However, if it is determined 1514 that the value of equation (5) is not less than Threshold_DL 1182, then it may be determined 1518 that the new connection 1170 should not be admitted 1518.

The method 1500 may include determining 1522 that there is a demand for a new uplink connection 1170. If it is determined 1522 that there is a demand for a new uplink connection 1170, the method 1500 may include determining 1524 the percentage of slots 224 in the current uplink sub-frame 218 that are allocated for transmission (i.e., p_UL(n) 1186). The method 1500 may also include determining 1526 the uplink bandwidth demand for the new connection 1170 (i.e., BW_UL 1190). The method 1500 may also include determining 1528 the uplink air-interface capacity (i.e., C_UL 1192).

The method 1500 may also include determining 1530 the value of the following expression:

$$p\_UL(n)+BW\_UL/C\_UL \tag{6}$$

The value of equation (6) may then be compared to the uplink threshold (Threshold_UL) 1194. If it is determined 1532 that the value of equation (6) is less than Threshold_UL 1194, the new connection 1170 should be admitted and a request may be sent 1516 to the base station 104 to set up this new connection. However, if it is determined 1532 that the value of equation (6) is not less than Threshold_UL 1194, then it may be determined 1518 that the new connection 1170 should not be admitted.

Thus, FIG. 15 illustrates another example of how a subscriber station 1106 may determine whether a new connection 1170 should be admitted based on resource availability. As indicated above, the term resource availability refers to the extent to which the resources of a wireless communication network 100 are being utilized, e.g., the level of congestion of the wireless communication network 100.

The method 1500 of FIG. 15 described above may be performed by various hardware and/or software component(s) and/or module(s) corresponding to the means-plus-function blocks 1500A illustrated in FIG. 15A. In other words, blocks 1502 through 1532 illustrated in FIG. 15 correspond to means-plus-function blocks 1502A through 1532A illustrated in FIG. 15A.

Figure 16:
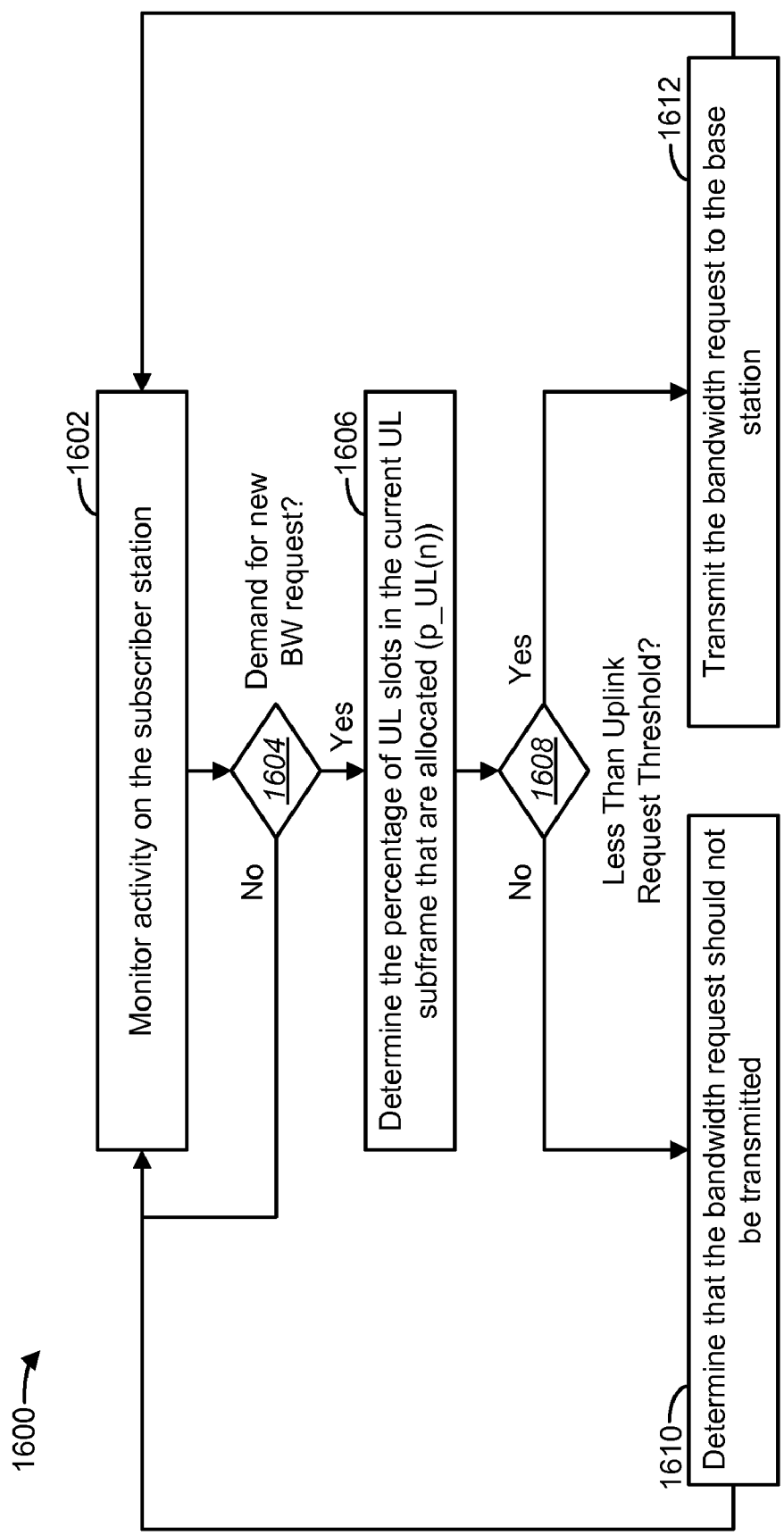
FIG. 16 illustrates an alternative method for performing admission control with respect to new bandwidth requests.

FIG. 16 illustrates an alternative method 1600 for performing admission control with respect to new bandwidth requests 1008. The subscriber station 1106 may implement the depicted method 1600. For example, the processor 1148 of the subscriber station 1106 may execute the bandwidth request admission control instructions 1199 that are stored in the memory 1150 of the subscriber station 1106 to implement the depicted method 1600.

The method 1600 may include monitoring 1602 activity on the subscriber station 1106. If it is determined 1604 that there is a demand for a new bandwidth request 1008, the method 1600 may include determining 1606 the percentage of slots 224 in the current uplink sub-frame 218 that are allocated for transmission (i.e., p_UL(n) 1186). The value of p_UL(n) 1186 may then be compared to the bandwidth request threshold (i.e., Threshold_UL_1 1196). If it is determined 1608 that p_UL(n) 1186 is greater than Threshold_UL_1 1196, then it may be determined 1610 that the bandwidth request 1008 should not be transmitted. However, if it is determined 1608 that p_UL(n) 1186 is less than Threshold_UL_1 1196, then it may be determined that the bandwidth request 1008 should be transmitted, and the bandwidth request 1008 may be transmitted 1612 to the base station 104.

Thus, FIG. 16 illustrates another example of how a subscriber station 1106 may determine whether a bandwidth request 1008 should be admitted based on resource availability. As indicated above, the term resource availability refers to the extent to which the resources of a wireless communication network 100 are being utilized, e.g., the level of congestion of the wireless communication network 100.

Figure 16A:
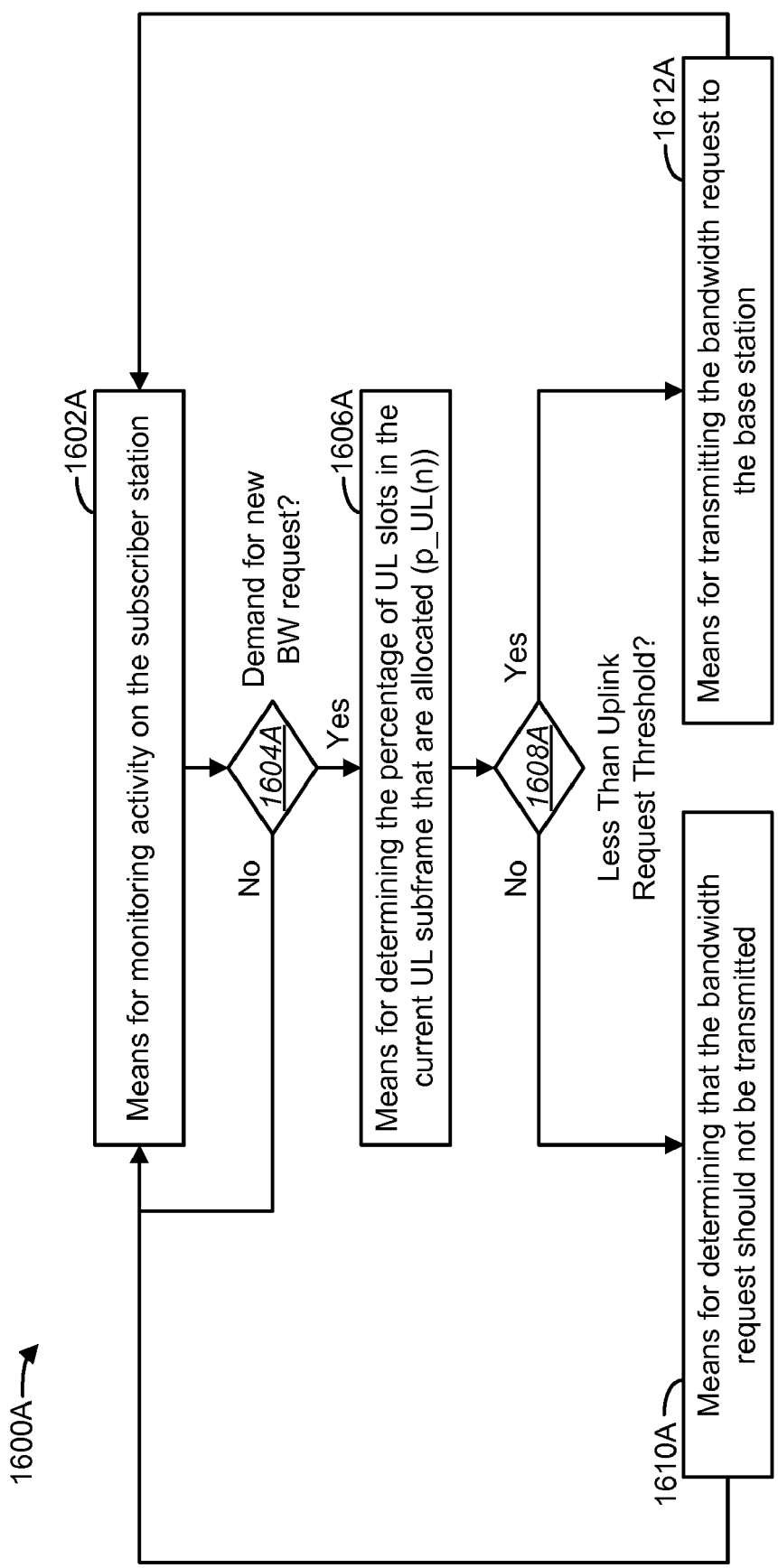
FIG. 16A illustrates means-plus-function blocks corresponding to the method of FIG. 16.

The method 1600 of FIG. 16 described above may be performed by various hardware and/or software component(s) and/or module(s) corresponding to the means-plus-function blocks 1600A illustrated in FIG. 16A. In other words, blocks 1602 through 1612 illustrated in FIG. 16 correspond to means-plus-function blocks 1602A through 1612A illustrated in FIG. 16A.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

As used herein, the terms "code" and "instructions" should be interpreted broadly to include any type of computer-readable statement(s). For example, the terms "code" and "instructions" may refer to one or more programs, routines, sub-routines, functions, procedures, etc.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A computer-readable medium may be any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated by FIGS. 7-9 and 12-16, can be downloaded and/or otherwise obtained by a subscriber station and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a subscriber station and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for priority-based network congestion control, the method being implemented by a network entity, the method comprising:

determining one or more priorities associated with a service request that is being processed by the network entity;

determining resource availability;

determining whether to grant the service request based on the one or more priorities associated with the service request and the resource availability;

determining whether to request a handover of lower priority services based on the one or more priorities associated with the service request and the resource availability; and sending a message to a subscriber station to implement subscriber station-based admission control, wherein implementing subscriber station-based admission control comprises determining whether to send a subsequent service request based on a priority associated with the subsequent service request and not sending low priority service requests when there is insufficient resource availability, wherein sending the message comprises sending a broadcast message to devices assigned to a non-emergency category to start the subscriber station based admission control in response to detecting network congestion.

2. The method of claim 1, wherein the one or more priorities comprise a priority of a device that sent the service request.

3. The method of claim 1, wherein the one or more priorities comprise a priority of the service request.

4. The method of claim 1, wherein the one or more priorities are identified in the service request.

5. The method claim 1, further comprising:
determining that there is insufficient network bandwidth for a high-priority service request; and
requesting that a base station take at least one action to reduce network congestion.

6. A method for priority-based network congestion control, the method being implemented by a subscriber station, the method comprising:
transmitting a service request that comprises one or more priorities that are associated with the service request;
receiving an instruction from a network entity to implement subscriber station-based admission control, wherein the network entity determines whether to request handover of lower priority services based on the one or more priorities and resource availability, wherein the network entity sends a broadcast message to devices assigned to a non-emergency category to start the subscriber station based admission control in response to detecting network congestion; and
implementing subscriber station-based admission control in response to the instruction from the network entity, wherein implementing subscriber station-based admission control comprises determining whether to send a subsequent service request based on a priority associated with the subsequent service request.

7. The method of claim 6, wherein the one or more priorities comprise a priority of the subscriber station.

8. The method of claim 6, wherein the one or more priorities comprise a priority of the service request.

9. The method of claim 6, wherein implementing subscriber station-based admission control comprises not sending low priority service requests when there is insufficient network bandwidth.

10. A network entity that is configured to implement priority-based network congestion control, comprising:
a processor;
memory in electronic communication with the processor;
instructions stored in the memory, the instructions being executable by the processor to:
determine one or more priorities associated with a service request that is being processed by the network entity;
determine resource availability;
determine whether to grant the service request based on the one or more priorities associated with the service request and the resource availability;
determine whether to request a handover of lower priority services based on the one or more priorities associated with the service request and the resource availability; and
send a message to a subscriber station to implement subscriber station-based admission control, wherein implementing subscriber station-based admission control comprises determining whether to send a subsequent service request based on a priority associated with the subsequent service request and not sending low priority service requests when there is insufficient resource availability, wherein the instructions to send the message are executable by the processor to send a broadcast message to devices assigned to a non-emergency category to start the subscriber station-based admission control in response to detecting network congestion.

11. The network entity of claim 10, wherein the one or more priorities comprise a priority of a device that sent the service request.

12. The network entity of claim 10, wherein the one or more priorities comprise a priority of the service request.

13. The network entity of claim 10, wherein the one or more priorities are identified in the service request.

14. The network entity of claim 10, wherein the instructions are also executable by the processor to:
determine that there is insufficient network bandwidth for a high-priority service request; and
request that a base station take at least one action to reduce network congestion.

15. A subscriber station that is configured to implement priority-based network congestion control, comprising:
a processor;
memory in electronic communication with the processor;
instructions stored in the memory, the instructions being executable by the processor to:
transmit a service request that comprises one or more priorities that are associated with the service request;
receive an instruction from a network entity to implement subscriber station-based admission control, wherein the network entity determines whether to request handover of lower priority services based on the one or more priorities and resource availability, wherein the network entity sends a broadcast message to devices assigned to a non-emergency category to start the subscriber station based admission control in response to detecting network congestion; and
implement subscriber station-based admission control in response to the instruction from the network entity, wherein implementing subscriber station-based admission control comprises determining whether to send a subsequent service request based on a priority associated with the subsequent service request.

16. The subscriber station of claim 15, wherein the one or more priorities comprise a priority of the subscriber station.

17. The subscriber station of claim 15, wherein the one or more priorities comprise a priority of the service request.

18. The subscriber station of claim 15, wherein implementing subscriber station-based admission control comprises not sending low priority service requests when there is insufficient network bandwidth.

19. A network entity that is configured to implement priority-based network congestion control, comprising:
means for determining one or more priorities associated with a service request that is being processed by the network entity;
means for determining resource availability;
means for determining whether to grant the service request based on the one or more priorities associated with the service request and the resource availability;
means for determining whether to request a handover of lower priority services based on the one or more priorities associated with the service request and the resource availability; and
a transmitter for sending a message to a subscriber station to implement subscriber station-based admission control, wherein implementing subscriber station-based admission control comprises determining whether to send a subsequent service request based on a priority associated with the subsequent service request and not sending low priority service requests when there is insufficient resource availability, wherein the transmitter sends a broadcast message to devices assigned to a non-emergency category to start the subscriber station-based admission control in response to detecting network congestion.

20. The network entity of claim 19, wherein the one or more priorities comprise a priority of a device that sent the service request.

21. The network entity of claim 19, wherein the one or more priorities comprise a priority of the service request.

22. The network entity of claim 19, wherein the one or more priorities are identified in the service request.

23. The network entity of claim 19, further comprising:
means for determining that there is insufficient network bandwidth for a high-priority service request; and
means for requesting that a base station take at least one action to reduce network congestion.

24. A subscriber station that is configured to implement priority-based network congestion control, comprising:
means for transmitting a service request that comprises one or more priorities that are associated with the service request;
means for receiving an instruction from a network entity to implement subscriber station-based admission control, wherein the network entity determines whether to request handover of lower priority services based on the one or more priorities and resource availability, wherein the network entity sends a broadcast message to devices assigned to a non-emergency category to start the subscriber station based admission control in response to detecting network congestion; and
means for implementing subscriber station-based admission control in response to the instruction from the network entity, wherein implementing subscriber station-based admission control comprises determining whether to send a subsequent service request based on a priority associated with a subsequent service request.

25. The subscriber station of claim 24, wherein the one or more priorities comprise a priority of the subscriber station.

26. The subscriber station of claim 24, wherein the one or more priorities comprise a priority of the service request.

27. The subscriber station of claim 24, wherein implementing subscriber station-based admission control comprises not sending low priority service requests when there is insufficient network bandwidth.

28. A computer-program product for implementing priority-based network congestion control, the computer-program product comprising a non-transitory computer-readable storage medium having instructions stored thereon, the instructions being executable by one or more processors and comprising:
code for determining one or more priorities associated with a service request that is being processed by a network entity;
code for determining resource availability;
code for determining whether to grant the service request based on the one or more priorities associated with the service request and the resource availability;
code for determining whether to request a handover of lower priority services based on the one or more priorities associated with the service request and the resource availability; and
code for sending a message to a subscriber station to implement subscriber station-based admission control, wherein implementing subscriber station-based admission control comprises determining whether to send a subsequent service request based on a priority associated with the subsequent service request and not sending low priority service requests when there is insufficient resource availability, wherein the code for sending the message comprises code for sending a broadcast message to devices assigned to a non-emergency category to start the subscriber station-based admission control in response to detecting network congestion.

29. The computer-program product of claim 28, wherein the one or more priorities comprise a priority of a device that sent the service request.

30. The computer-program product of claim 28, wherein the one or more priorities comprise a priority of the service request.

31. The computer-program product of claim 28, wherein the one or more priorities are identified in the service request.

32. The computer-program product of claim 28, further comprising:
code for determining that there is insufficient network bandwidth for a high-priority service request; and
code for requesting that a base station take at least one action to reduce network congestion.

33. A computer-program product for implementing priority-based network congestion control, the computer-program product comprising a non-transitory computer-readable medium having processor executable instructions stored thereon, the instructions being executable by one or more processors and comprising:
code for transmitting a service request that comprises one or more priorities that are associated with the service request;
code for receiving an instruction from a network entity to implement subscriber station-based admission control, wherein the network entity determines whether to request handover of lower priority services based on the one or more priorities and resource availability, wherein the network entity sends a broadcast message to devices assigned to a non-emergency category to start the subscriber station based admission control in response to detecting network congestion; and
code for implementing subscriber station-based admission control in response to the instruction from the network entity, wherein implementing subscriber station-based admission control comprises determining whether to send a subsequent service request based on a priority associated with a subsequent service request.

34. The computer-program product of claim 33, wherein the one or more priorities comprise a priority of a subscriber station.

35. The computer-program product of claim 33, wherein the one or more priorities comprise a priority of the service request.

36. The computer-program product of claim 33, wherein implementing subscriber station-based admission control comprises not sending low priority service requests when there is insufficient network bandwidth.

* * * * *